(12) United States Patent
Ohkawara et al.

(10) Patent No.: US 6,356,307 B2
(45) Date of Patent: *Mar. 12, 2002

(54) LENS CONTROL DEVICE WITH AF RESTART FEATURE

(75) Inventors: Hiroto Ohkawara, Ibaraki-ken; Masahide Hirasawa; Taeko Tanaka, both of Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,997

(22) Filed: May 21, 1998

Related U.S. Application Data

(62) Division of application No. 08/418,269, filed on Apr. 6, 1995, now Pat. No. 5,786,853.

(30) Foreign Application Priority Data

| Apr. 12, 1994 | (JP) | 6-098024 |
| Apr. 12, 1994 | (JP) | 6-098026 |
| Apr. 12, 1994 | (JP) | 6-098027 |
| Aug. 4, 1994 | (JP) | 6-202830 |

(51) Int. Cl.⁷ ............................................. H04N 5/225
(52) U.S. Cl. ........................ 348/360; 348/345; 396/71
(58) Field of Search .................................. 348/335, 344, 348/345, 357, 358, 360, 347; 396/79–82, 90, 91, 93, 71, 125, 133, 529, 530, 85; H04N 5/232

(56) References Cited

U.S. PATENT DOCUMENTS

| 4,994,842 A | * | 2/1991 | Itoh et al. ................... 348/347 |
| 5,161,026 A | * | 11/1992 | Mabuchi et al. ............ 348/335 |
| 5,463,442 A | * | 10/1995 | Harigaya et al. ........... 348/345 |

* cited by examiner

Primary Examiner—Tuan Ho
(74) Attorney, Agent, or Firm—Robin, Blecker & Daley

(57) ABSTRACT

A lens control device comprising a variator lens group for zooming, a focusing lens group for compensating for a change introduced into the focused position as a result of a zooming operation by the variator lens group, a conversion lens group for changing a focusable shifting area of the variator lens group from a first area to a second area, a computing circuit for determining driving information for driving the focusing lens group during the shifting of the variator lens group, based on focused position data, according to object distance, of the focusing lens group relative to the position of the variator lens group, and a control circuit for shifting the variator lens group from the first area to the second area in response to the mounting of the conversion lens group and for controlling a computing operation of the computing circuit so that a focused position of the focusing lens group is determined when the variator lens group moves within the second area.

12 Claims, 20 Drawing Sheets

$$a_x = a_k - \frac{(z_k - z_x)(a_k - a_{k-1})}{(z_k - z_{k-1})}$$

$$b_x = b_k - \frac{(z_k - z_x)(b_k - b_{k-1})}{(z_k - z_{k-1})}$$

| v \ n | 0 | 1 | 2 | 3 | ..... | k | ..... | m |
|---|---|---|---|---|---|---|---|---|
| 0 | A00 | A10 | A20 | A30 | ..... | Ak0 | ..... | Am0 |
| 1 | A01 | A11 | A21 | A31 | ..... | Ak1 | ..... | Am1 |
| 2 | A02 | A12 | A22 | A32 | ..... | Ak2 | ..... | Am2 |
| 3 | A03 | A13 | A23 | A33 | ..... | Ak3 | ..... | Am3 |
| ⋮ | ⋮ | ⋮ | ⋮ | ⋮ | ⋮ | ⋮ | ⋮ | ⋮ |
| k | A0k | A1k | A2k | A3k | ..... | Akk | ..... | Amk |
| ⋮ | ⋮ | ⋮ | ⋮ | ⋮ | ⋮ | ⋮ | ⋮ | ⋮ |
| s | A0s | A1s | A2s | A3s | ..... | Aks | ..... | Ams |

| v \ n | 0 | 1 | 2 | 3 | ..... | k | ..... | m |
|---|---|---|---|---|---|---|---|---|
| 0 | B00 | B10 | B20 | B30 | ..... | Bk0 | ..... | Bm0 |
| 1 | B01 | B11 | B21 | B31 | ..... | Bk1 | ..... | Bm1 |
| 2 | B02 | B12 | B22 | B32 | ..... | Bk2 | ..... | Bm2 |
| 3 | B03 | B13 | B23 | B33 | ..... | Bk3 | ..... | Bm3 |
| ⋮ | ⋮ | ⋮ | ⋮ | ⋮ | ⋮ | ⋮ | ⋮ | ⋮ |
| k | B0k | B1k | B2k | B3k | ..... | Bkk | ..... | Bmk |
| ⋮ | ⋮ | ⋮ | ⋮ | ⋮ | ⋮ | ⋮ | ⋮ | ⋮ |
| t | B0t | B1t | B2t | B3t | ..... | Bkt | ..... | Bmt |

LENS CONTROL DEVICE WITH AF RESTART FEATURE

CROSS-REFERENCE TO RELATED APPLICATION

This application is a divisional of application Ser. No. 08/418,269, filed Apr. 6, 1995, now patented, U.S. Pat. No. 5,786,853.

BACKGROUND OF THE INVENTION

1. Field of the Invention

The present invention relates to a camera which is provided with a zoom lens and a lens capable of being mounted onto the zoom lens in a detachable manner to modify the focal length and magnifying power of the zoom lens.

2. Description of the Related Art

Conventionally available as one type of camera is the one provided with a zoom lens and a conversion lens which is mounted onto the zoom lens in a detachable manner to modify the focal length and power of the zoom lens.

Referring to drawings, the conventional arrangement of the zoom lens and the conversion lens which is mounted onto the zoom lens in a detachable manner to modify the focal length and magnification of the zoom lens is discussed below. FIG. 1 is a diagrammatic view showing the arrangement of a conventional camera comprising a zoom lens and a conversion lens which is mounted onto the zoom lens to modify the focal length and power of the zoom lens.

A zoom lens unit 100 comprises a first (front) lens group 101 mounted onto a lens casing as shown in FIG. 1.

Disposed behind the first lens group 101 is a second lens group (hereinafter referred to as "a variator lens") 102 for zooming. The variator lens 102 shares the same optical axis with the first lens group 101. To vary its power, the variator lens 102 is moved in a direction in parallel with the optical axis of its own by driving means (not shown).

An iris 103 is disposed behind the variator lens 102 to adjust light quantity. Disposed further behind the iris 103 is a third lens group 104 that is attached onto the lens casing. The third lens group 104 also shares the same optical axis with the variator lens 102.

Arranged behind the third lens group 104 is a fourth lens group (hereinafter referred to as "a focus-compensation lens") 105. The focus-compensation lens 105 has a focusing function, and a compensation function, namely compensating for the displacement of the focal plane arising from zooming. The focus-compensation lens 105 shares the same optical axis with the third lens group 104. The focus-compensation lens 105 is moved in a direction in parallel with the optical axis of its own by the driving means so that the focusing and compensation are performed.

An image pickup device 106 such as a CCD is arranged behind the zoom lens unit 100, namely the focus-compensation lens 105. An imaging surface that bears an optical image of an object is provided on one side of the CCD 106 facing the focus-compensation lens 105.

A wide-angle attachment lens 121 is mounted onto the zoom lens unit 100 in a detachable manner to modify the focal length and power of the lens unit 100. When mounted onto the zoom lens unit 100, the wide-angle attachment lens 121 is positioned in front of the first lens group 101 in a manner that allows the optical axes of both are aligned. The mounting of the wide-angle attachment lens 121 causes the focal length of the zoom lens unit 100 to shift toward the wide-angle side.

Discussed below referring to drawings are a relationship between the focal length (the position of the variator lens 102) of the zoom lens unit 100 and the position of the focus-compensation lens 105 with no wide-angle attachment lens 121 mounted and a similar relationship but with the wide-angle attachment lens 121 mounted. FIGS. 2(a) and 2(b) illustrate, respectively, the relationship between the focal length (the position of the variator lens 102) of the zoom lens unit 100 and the position of the focus-compensation lens 105 with no wide-angle attachment lens 121 mounted and the same relationship but with the wide-angle attachment lens 121 mounted in FIG. 1. FIG. 3 shows the relationship between the position of the variator lens and the position of the focus-compensation lens with no wide-angle attachment lens mounted in FIG. 1. FIG. 4 shows a similar relationship.

A discussion of the relationship between the focal length (the position of the variator lens 102) of the zoom lens unit 100 and the position of the focus-compensation lens 105 with no wide-angle attachment lens mounted follows.

When the focal length of the zoom lens unit 100 is set to a predetermined value, the position of the focus-compensation lens 105 that results in an optical image on the imaging surface of the CCD 106, namely, the focused position of the focus-compensation lens 105 varies with the distance to the object as shown in FIG. 2(a). When the object distance remains constant, the focused position of the focus-compensation lens 105 varies with the focal length of the zoom lens unit 100, namely, the position of the variator lens 102. As a result, an optical image is obtained through the light which is focused by shifting the focus-compensation lens 105 according to the curve resulting from the focal length set and the object distance.

A discussion of how to follow the above-mentioned curve follows.

Referring to FIG. 3, the relationship between the focal length (the position of the variator lens 102) of the zoom lens unit 100 and the position of the focus-compensation lens 105 with no wide-angle attachment lens 121 mounted is illustrated by a first curve f1 that is a plot of a series of positions of the variator lens 102, z0, z1, z2, . . . , z6 versus a corresponding series of positions of the focus-compensation lens 105, a0, a1, a2, . . . , a6. Data, z0, z1, z2, . . . , z6 and a0, a1, a2, . . . , a6, are stored in a lens control microcomputer (not shown). Equally, a second curve f2 is a plot of a series of positions of the variator lens 102, z0, z1, z2, . . . ) z6 versus a corresponding series of positions of the focus-compensation lens 105, b0, b1, b2, . . . , b6. These data are also stored in the lens control microcomputer.

A third curve f3, however, is calculated from the first curve f1 and the second curve f2. The third curve f3 is a plot of a series of positions of the variator lens 102, z0, z1, z2, . . . , z6 versus a corresponding series of positions of the focus-compensation lens 105, p0, p1, p2, . . . , p6. These data are also stored in the lens control microcomputer.

p0, p1, p2, . . . , p6 are calculated by the following equation.

$$p(n+1)=\{|p(n)-(n)|/|b(n)-a(n)|\}*\{|b(n+1)-a(n+1)|\}+a(n+1) \qquad (1)$$

Equation (1) determines the ratio of interior division of p0 on a line segment, b0-a0, when the focus-compensation lens 105 is positioned at p0. According to the ratio, p1 is plotted on a line segment, b1-a1. The speed of the focus-compensation lens 105 required to keep the zoom lens unit 100 focused is thus determined by the positional difference between p1 and p0 and the time the variator lens 102 requires to travel from z0 to z1.

Referring to FIG. 4, interpolation applied to the variator lens 102 in its one direction is discussed. In FIG. 4, the position of the variator lens 102 is arbitrarily set, and representative (cam) locus (the positions of the focus-compensation lens relative to the variator lens) is a plot of the positions of the variator lens 102, z0, z1, z2, ..., zn and a0, a1, a2, ..., an, and b0, b1, b2, ..., bn relative to the object distance.

When the variator lens 102 is positioned at zx, not on any of the zooming boundaries represented by z0, z1, z2, ..., zn within the range of travel of the variator lens 102 (namely, somewhere between zk-1 and zk) and when the focus-compensation lens 105 is positioned at px, both ax and bx are given by the following equations.

$$ax = ak - (zk-zx)*(ak-ak-1)/(zk-zk-1) \quad (2)$$

$$bx = bk - (zk-zx)*(bk-bk-1)/(zk-zk-1) \quad (3)$$

As understood from the above equations, ax and bx are determined by interpolating, respectively, between two sets of stored representative locus data (ak, and ak-1, and bk, and bk-1 in FIG. 4) with respect to a fixed object distance according to the interior division ratios obtained from two sets of zooming boundaries (for example, zk and zk-1 in FIG. 4) and the position of the variator lens 102 between zk and zk-1.

As understood from Equation (1), both pk and pk-1 are determined by interpolating, respectively, two sets of stored representative locus data (ak, ak-1, bk, and bk-1 in FIG. 4) with respect to a fixed focal length according to the interior division ratio obtained from ax, px, and bx.

The travel speed of the focus-compensation lens 105 required to keep the zoom lens unit 100 focused is determined by the position difference between a focused position to be followed and the currently focused position in the zooming operation from a wide-angle side to a telephoto side and the time the variator lens 102 requires to travel from zx to zk.

The zoom lens unit 100 thus follows the curve representing the relationship between the focal length (the position of the variator lens 102) of the zoom lens unit 100 and the position of the focus-compensation lens 105 with no wide-angle attachment lens 121 mounted.

The relationship between the focal length (the position of the variator lens 102) of the zoom lens unit 100 and the position of the focus-compensation lens 105 with the wide-angle attachment lens 121 mounted is now discussed.

When the focal length of the zoom lens unit 100 is set to a predetermined value, the focused position of the focus-compensation lens 105 varies with the object distance as shown in FIG. 2(b). With the object distance kept constant, the focused position of the focus-compensation lens 105 varies with the focal length, namely with the position of the variator lens 102 (along a locus). As can be seen from FIG. 2(b), however, the curve representing the relationship, in terms of object distance as parameter, between the focal length and the position of the focus-compensation lens 105 is different from the curve representing the relationship, in terms of object distance as parameter, between the focal length and the position of the focus-compensation lens 105 with no wide-angle attachment lens 121 mounted. In FIG. 2(b), if the focal length exceeds a limit 301, the curves representing the relationship, in terms of object distance as parameter, between the focal length and the position of the focus-compensation lens 105 diverge out of the focusable focal length area. If the focal length is kept to within the limit 301, namely, the focal length is set to any value closer to the wide-angle side, focus adjustment by means of the focus-compensation lens 105 remains workable. If the focal length exceeds the limit 301, however, namely, the focal length is set to any value closer to the telephoto side, focus adjustment by means of the focus-compensation lens 105 is impossible. To cope with this problem, the variator lens 102 is moved until the focal length is set to be closer to the wide-angle side, and is fixed there.

Therefore, the variator lens 102 is fixed at such a predetermined position, and zooming operation is disabled when the wide-angle attachment lens 121 is mounted.

When the zooming operation is disabled with the wide-angle attachment lens 121 mounted, however, the magnification of the zoom lens unit 100 with the wide-angle attachment lens 121 mounted is fixed. A fine adjustment of field of view by modifying slightly the magnification of the zoom lens unit 100 with the wide-angle attachment lens 121 mounted is not possible, and a user cannot compose a picture as intended.

For example, assuming that the magnification of the zoom lens unit 100 is set to a range from 1× to 12×, and the magnification of the zoom lens unit 100 with the wide-angle attachment lens 121 mounted is set to a range from 0.7× to 1×, the disabling of the zooming operation at the mounting of the wide-angle attachment lens 121 sets the magnification to 0.7×. Although by detaching the wide-angle attachment lens 121, the setting of 1× to 12× is recovered, any magnification setting between 0.7× and 1× cannot be made.

When the zooming operation is enabled with the wide-angle attachment lens 121 mounted, focus adjustment is possible within a certain range of focal length; however, if the variator lens is moved within the focusable focal length area, focus adjustment cannot follow the shift of the variator lens 102, and thus focused state cannot be properly maintained.

SUMMARY OF THE INVENTION

It is a first object of the present invention to provide a lens control device and a camera, which perform a zooming operation while keeping a focused state and allow a user to set a field of view as intended, when a wide-angle attachment lens is mounted.

It is a second object of the present invention to provide a camera which causes no unfocused state when a wide-angle attachment lens is mounted.

It is a third object of the present invention to provide a camera which allows zooming operation when a wide-angle attachment lens is mounted.

To achieve the above objects, a preferred embodiment of the present invention comprises a variator lens group for zooming, a focusing lens group for compensating for a change introduced into the focused position as a result of a zooming operation by the variator lens group, a conversion lens group for changing a focusable shifting area of the variator lens group from a first area to a second area, computing means for determining driving information used to drive the focusing lens group during the shifting of the variator lens group, based on focused position data, according to object distance, of the focusing lens group relative to the position of the variator lens group, position data of the variator lens group and position data of the focusing lens group, and control means for shifting the variator lens group from the first area to the second area in response to the mounting of the conversion lens group and for controlling a computing operation of the computing means so that a focused position of the focusing lens group is determined when the variator lens group moves within the second area.

The present invention in another preferred embodiment provides a lens control device, wherein data of the focused position, set according to object distance, of the focusing lens group with respect to the variator lens group are made up of first focused position data regarding the first area and second focused position data regarding the second area.

The present invention in yet another preferred embodiment provides a lens control device, wherein data of the focused position, set according to object distance, of the focusing lens group with respect to the variator lens group are made up of first focused position data regarding the first area and the computing means determines second focused position data regarding the second area based on the first focused position data.

The present invention in yet another preferred embodiment provides a lens control device, wherein the computing means selects either the first focused position data or the second focused position data in response to the mounting or demounting of the conversion lens group, and computes the focused position data of the focusing lens group during the shifting of the variator lens group based on the selected first or second focused position data.

In the above preferred embodiments, the computing means thus computes the focused position data of the focusing lens group during the shifting of the variator lens group, when the variator lens group is shifted within the second area with the conversion lens group mounted.

It is a fourth object of the present invention to provide a camera which permits smooth zooming operation by optimizing the driving speed of the variator lens according to the range of travel of the variator lens that is shifted in response to the mounting of the conversion lens such as a wide-angle attachment lens.

It is a fifth object of the present invention to provide a camera which permits smooth and easy-to-use operation by allowing an operator to recognize the range of travel of the variator lens, namely, the focusable focal length area of the variator lens which is shifted in response to the mounting of the conversion lens such as the wide-angle attachment lens.

It is a sixth object of the present invention to provide a camera which reactivates AF (Automatic Focusing) operation in response to the mounting of the conversion lens to prevent unfocused state which is attributed to a change in the optical characteristics of the lens with the conversion lens such as the wide-angle attachment lens mounted.

These and other objects and features of the present invention will be more apparent when the following detailed description is considered with the attached drawings.

BRIEF DESCRIPTION OF THE DRAWINGS

FIGS. 9(a) and 9(b) are tables, each listing representative values representing the relationship between the focal length (the position of the variator lens) of the zoom lens unit and the position of the focus-compensation lens with no wide-angle attachment lens mounted and the same relationship but with the wide-angle attachment lens mounted in FIG. 5.

DETAILED DESCRIPTION OF THE PREFERRED EMBODIMENTS

Figure 1:
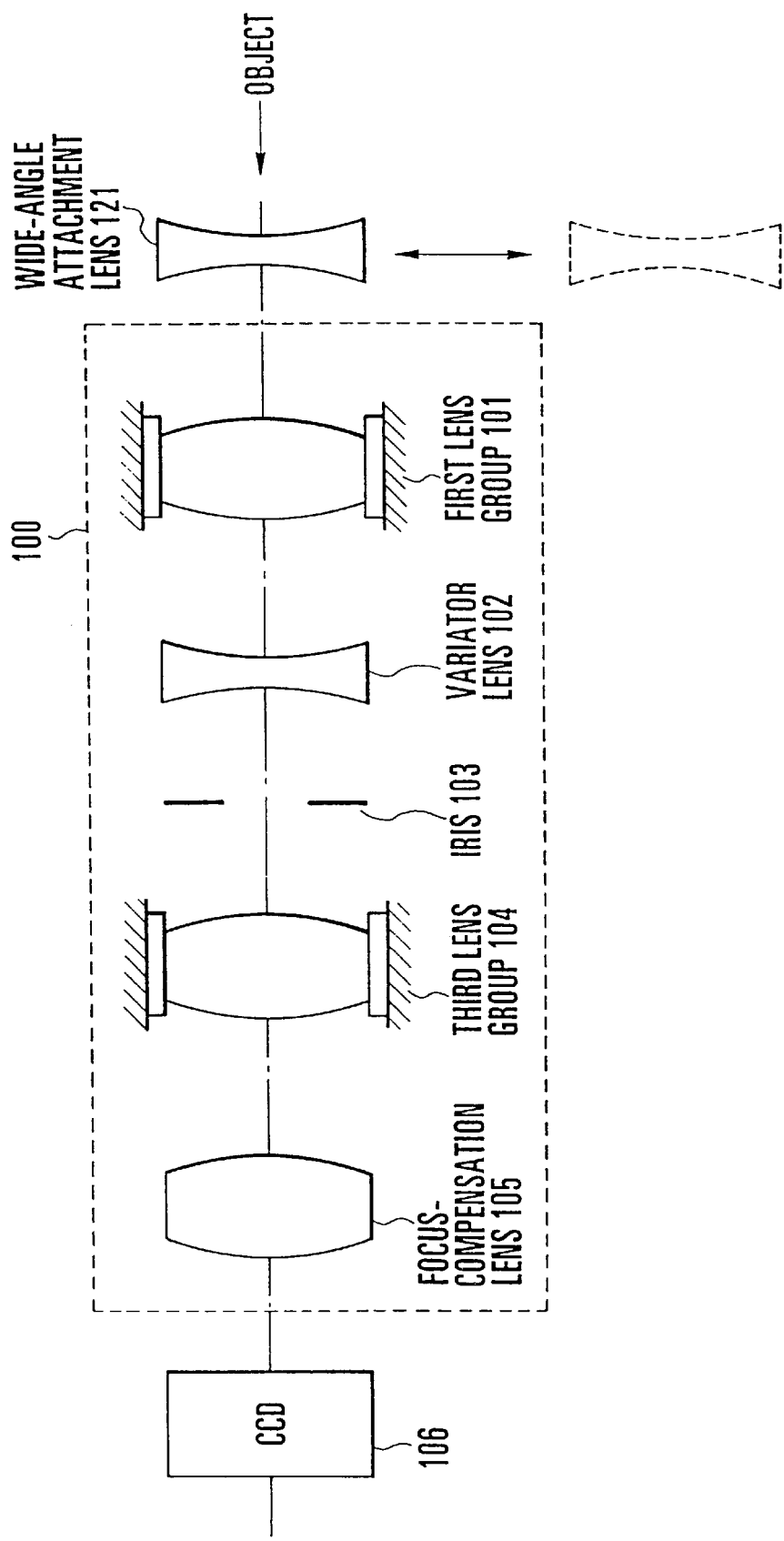
FIG. 1 is a diagrammatic view showing the arrangement of a camera which is a prior art of the present invention, comprising a zoom lens and a conversion lens which is mounted onto the zoom lens to modify the focal length and power of the zoom lens unit.

Referring now to the drawings, the embodiments of the present invention are discussed.

First Embodiment

Figure 5:
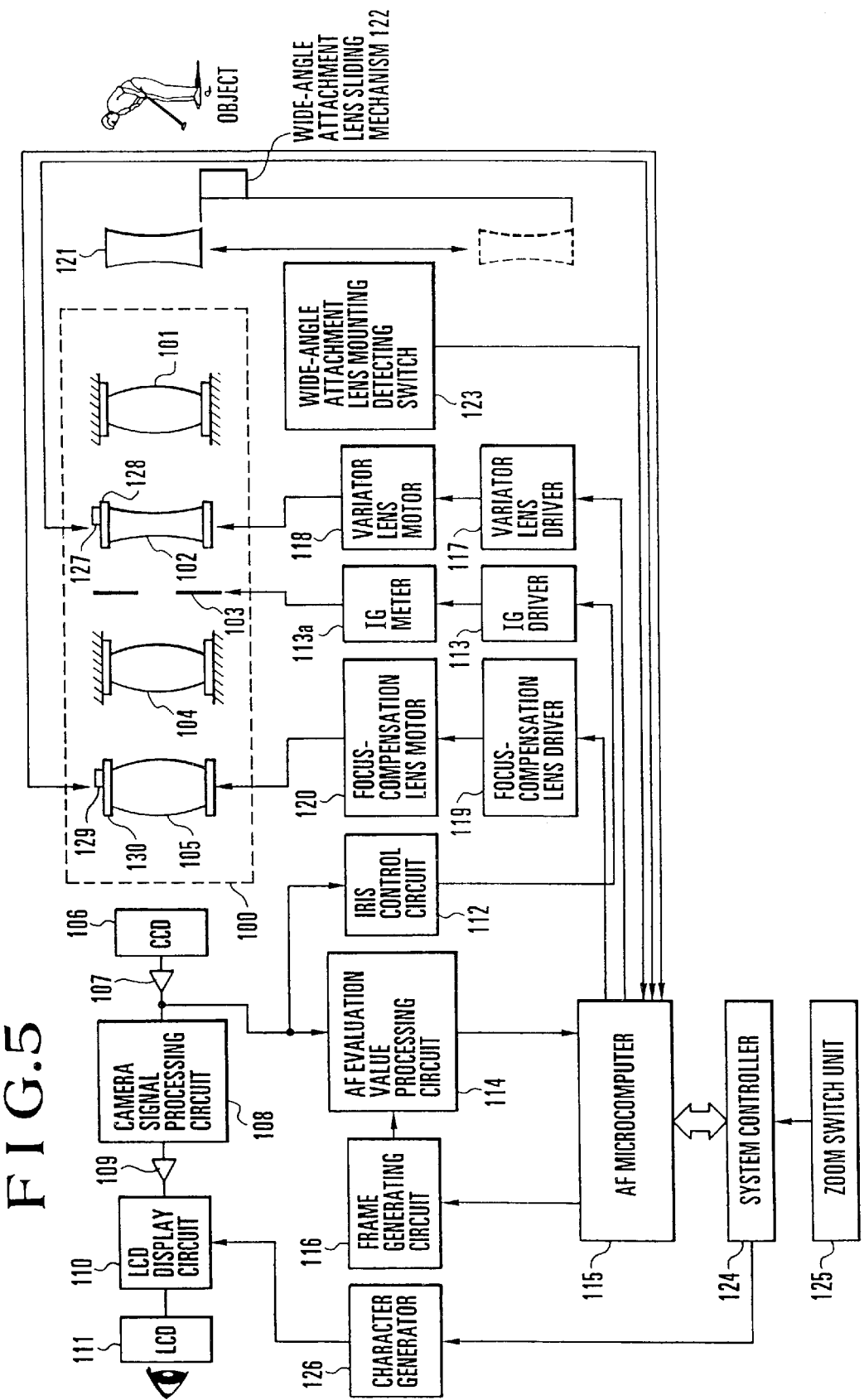
FIG. 5 is a block diagram showing the construction of a first embodiment of the camera according to the present invention.

FIG. 5 is the block diagram showing the construction of the camera of the first embodiment of the present invention.

As shown in FIG. 5, the camera in this embodiment has a zoom lens unit 100 in which focal length is adjusted by moving a variator lens within a first focal length area and its magnification is set within a range from 1× and 12×. The zoom lens unit 100, as shown in FIG. 5, comprises a first lens group 101 fixed to a lens casing. Disposed behind the first lens group 101 is a second lens group (namely the variator lens, and hereinafter referred to as "variator lens") 102 which shares the same optical axis with the first lens group 101. The variator lens 102 contains a position detecting switch 127 and a photosensor 128, for detecting if the variator lens 102 is at its reference position. The position detecting switch 127 travels across the boundary that is situated at an approximately middle position of the range of the travel of the variator lens 102. The output light of the photosensor 128 is blocked or transmitted in response to the travel of the position detecting switch 127. When the output light of the photosensor 128 changes from a light transmitted state to a light blocked state, the level of the signal indicative of the output light is transitioned from "1" to "0." The position where the signal level is transitioned is set as the reference position, and a determination is made of whether the variator lens 102 is positioned at the reference position.

The variator lens 102 is shifted along the optical axis of its own by a variator lens motor 118 to modify its power. The variator lens motor 118 is of a stepping motor type.

An iris 103 is disposed behind the variator lens 102 to adjust light quantity. Disposed further behind the iris 103 is a third lens group 104 that is attached onto the lens casing. The third lens group 104 also shares the same optical axis with the variator lens 102.

Arranged behind the third lens group 104 is a fourth lens group (hereinafter referred to as "a focus-compensation lens") 105. The focus-compensation lens 105 has a focusing function, and a compensation function, namely compensating for the displacement of the focal plane arising from zooming operation. The focus-compensation lens 105 shares the same optical axis with the third lens group 104. The focus-compensation lens 105 contains a position detecting switch 129 and a photosensor 130, for detecting if the focus-compensation lens 105 is at its reference position. The position detecting switch 129 travels across the boundary that is situated at an approximately middle position of the range of the travel of the focus-compensation lens 105. The output light of the photosensor 130 is blocked or transmitted in response to the travel of the position detecting switch 129. When the output light of the photosensor 130 changes from a light transmitted state to a light blocked state, the level of the signal indicative of the output light is transitioned from "1" to "0." The position where the signal level is transitioned is set as the reference position, and a determination is made of whether the focus-compensation lens 105 is positioned at its reference position.

The focus-compensation lens 105 is moved in the direction in parallel with the optical axis of its own by a focus-compensation lens motor 120 so that the focusing and compensation functions are performed. The focus-compensation lens 120 is of a stepping motor type.

An image pickup device 106 such as a CCD is arranged behind the zoom unit 100, namely, behind the focus-compensation lens 105. An imaging surface that bears an optical image of an object is provided on one side of the CCD 106 facing the focus-compensation lens 105.

CCD 106 photoelectrically converts an optical image borne on its imaging surface into a video signal, which, after being amplified by-an amplifier 107, is fed to a camera signal processing circuit 108, an AF evaluation value processing circuit 114, and an iris control circuit 112.

The camera signal processing circuit 108 performs a predetermined processing to the input video signal to convert it into a standardized video signal, and then outputs it. The video signal from the camera signal processing circuit 108 is amplified by an amplifier 109 up to a predetermined level to be fed to an LCD display circuit 110. The LCD display circuit 110 performs a predetermined processing on the input video signal before it is fed to an LCD 111, and then the LCD 111 displays the video signal. The LCD 111 is a liquid crystal display device, which presents characters representing photographing information derived from a character generator 126 along with the image represented by the video signal.

The iris control circuit 112 generates a control signal that controls the aperture state of the iris 103 in accordance with the level of input video signal. The control signal from the iris control circuit 112 is fed to an IG driver 113. In response to the control signal, the IG driver 113 drives its IG meter 113a. With the IG meter 113a driven, the aperture state of the iris 103 is controlled so that the level of video signal remains constant. Light quantity is thus adjusted.

The AF evaluation processing circuit 114 extracts a high frequency component, which varies in response to focusing, from a video signal within a distance measurement frame, based on a gate signal from a frame generator circuit 116, and uses the extracted high frequency component to generate an AF evaluation signal that represents the degree of focus matching.

The AF evaluation signal generated by the AF evaluation value processing circuit 114 is sent to an AF control microcomputer (hereinafter referred to as AF microcomputer) 115. The AF microcomputer 115 has the general control over the lens driving. The AF microcomputer 115 receives a detection signal from a wide-angle attachment lens mounting detecting switch 123. In response to the detection signal and the AF evaluation signal, the AF microcomputer 115 generates the control signal for shifting the variator lens 102, the control signal for shifting the focus-compensation lens 105, and a command signal instructing a change of distance measurement frame. The control signal for shifting the variator lens 102 is fed to a variator lens driver 117, the control signal for shifting the focus-compensation lens 105 is fed to a focus-compensation lens driver 119, and the command signal instructing a change of distance measurement frame is fed to the frame generator circuit 116.

In response to the control signal from the AF microcomputer 115, the variator lens driver 117 drives the variator lens motor 118. With the variator lens motor 118 driven, the variator lens 102 is moved along its optical axis. The variator lens 102 thus performs zooming operation, and shifts when the wide-angle attachment lens is mounted.

In response to the control signal from the AF microcomputer 115, the focus-compensation lens driver 119 drives the focus-compensation motor 120 to move the focus-compensation lens 105 in its optical axis. The focus-compensation lens 105 is thus driven so that a displacement in the focal plane is compensated for during the shifting of the variator lens 102 to keep focused state during the zooming operation.

The AF microcomputer 115 is connected to a system controller 124 through a bidirectional line. The system controller 124, having a microcomputer, has a general control over the operation of the video camera. The system controller 124 receives focal length information of the current setting in a zoom switch unit 125 in connection with the zoom lens unit 100, and zooming information such as zoom driving direction and focal length provided by the AF microcomputer 115. Furthermore, the system controller 124 controls the character generator 126 to present photographing information such as zoom information. The photographing information is presented along with the video signal on LCD 111.

The zoom switch unit 125 outputs to the system controller 124, a voltage corresponding to an angle of rotation of an operation member (not shown) which performs a zooming operation to the zoom lens unit 100. The system controller 124 performs computing operation in response to the input voltage and then outputs the driving direction and speed of the variator lens as focal length information.

Exchanged between the system controller 124 and the AF microcomputer 115 are the above-mentioned focal length information and the zooming information such zoom driving direction and focal length generated by the AF microcomputer 115.

A wide-angle attachment lens 121 is mounted in front of the fixed first lens group 101 of the zoom lens unit 100 in a detachable manner to adjust its focal length and power. When mounted, the wide-angle attachment lens 121 is positioned in front of the first lens group 101 so that the optical axis of the wide-angle attachment lens 121 is aligned with that of the first lens group 101. With the wide-angle attachment lens 121 mounted, the focusable focal length area of the zoom lens unit 100 is shifted to a second focal length area from a first focal length area, the focal length of the zoom lens unit 100 is shifted toward the wide-angle side, and its power is switched to within a range from 0.7× to 1×.

The mounting of the wide-angle attachment lens 121 onto the zoom lens unit 100 is performed using a wide-angle attachment lens sliding mechanism 122. The presence or absence of the wide-angle attachment lens 121 is detected by the wide-angle attachment lens mounting detecting switch 123. The detection signal indicative of the presence or absence of the wide-angle attachment lens 121 is sent to the AF microcomputer 115.

Referring now to drawings, the operation of the camera in this embodiment is discussed.

Figure 6:
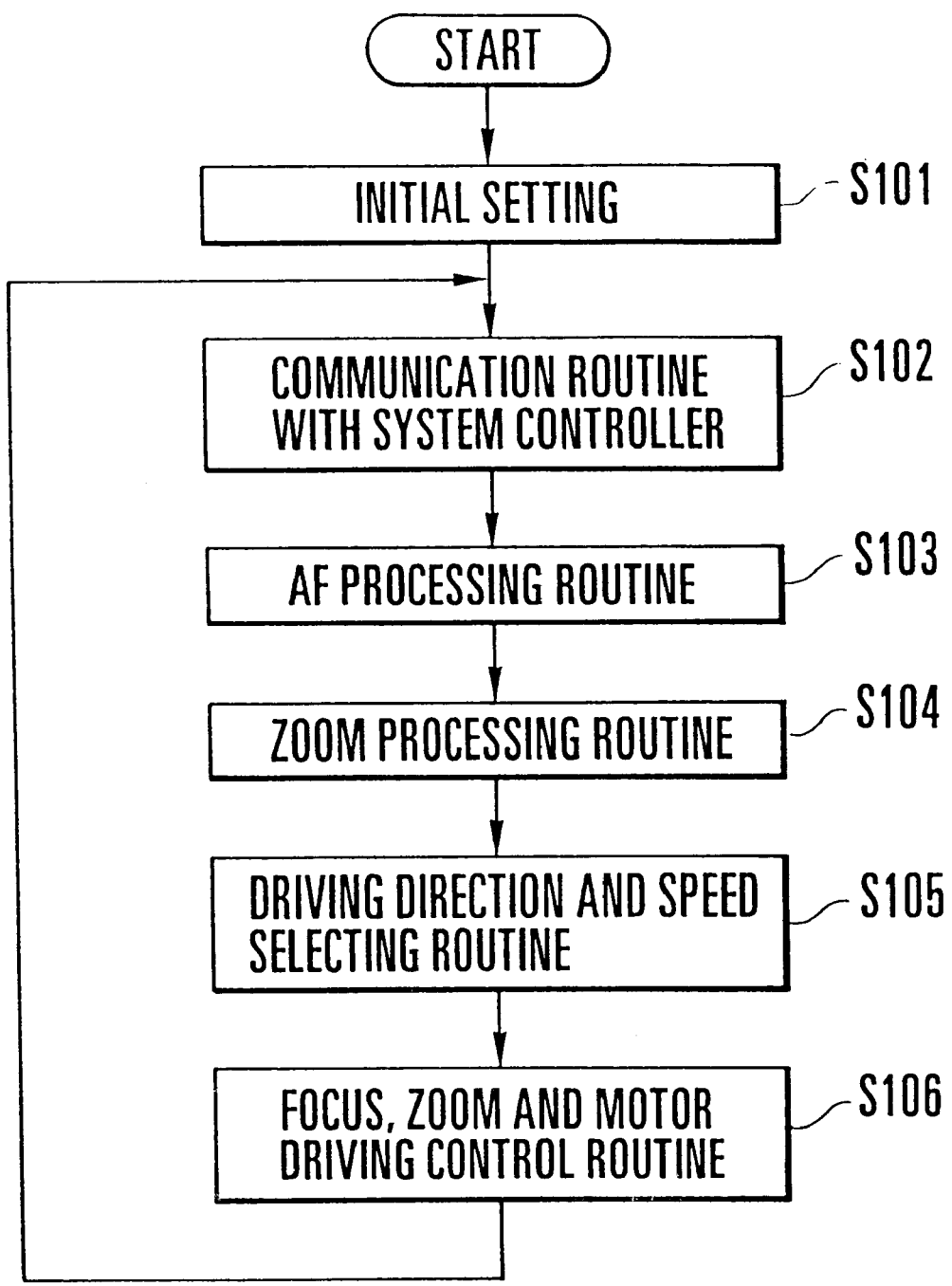
FIG. 6 is a flow diagram showing the control operation of the camera of FIG. 5.

FIG. 6 is a flow diagram showing the control operation of the camera. The processing illustrated herein is executed in the AF microcomputer 115.

As shown in FIG. 6, the initial setting is performed at the start of the processing (step S101). In the initial setting, the RAM and the variety of ports in the AF microcomputer 115 are initialized.

Then, a communication routine follows (step S102). Exchanged in the communication routine between the AF microcomputer 115 and the system controller 124 are the focal length information such as the operational information of the zoom switch unit 125 and the position of the variator lens 102, the direction in which the variator lens 102 is driven under the zoom control of the AF microcomputer 115, namely the zoom driving direction, information indicative of the mounting of the wide-angle attachment lens 121, and information indicative of the operative zoom driving area which is changed according to the presence or absence of the wide-angle attachment lens 121 on the zoom lens unit 100. In response to each signal, the system controller 124 controls the character generator 126 in order to present the necessary pieces of information on LCD 111.

The communication routine is followed by the AF processing routine (step S103). In the AF processing routine, several operations such as integrating operation, peak detection, difference calculus are performed on the AF evaluation signals such as high frequency components, and automatic focusing is performed by driving the focus-compensation lens 105 based on a change in the AF evaluation signals.

Figure 2A:
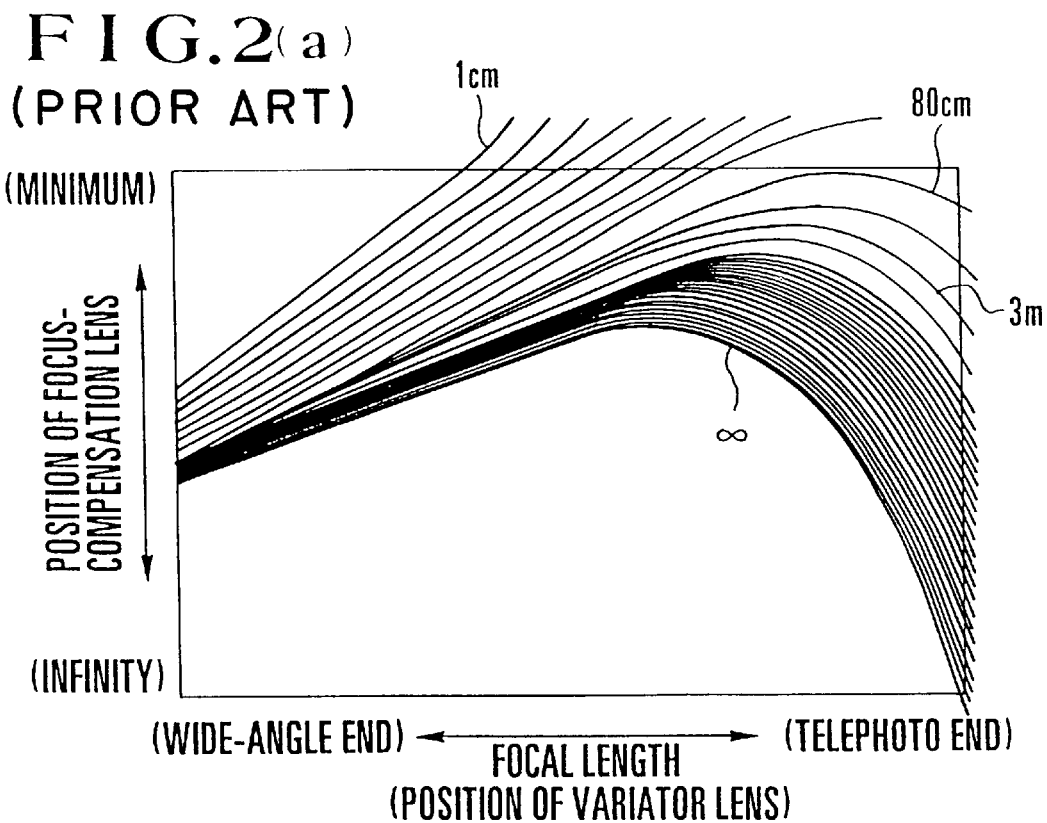
FIGS. 2(a) and 2(b) illustrate, respectively, the relationship between the focal length (the position of the variator lens) of the zoom lens unit and the position of the focus-compensation lens with no wide-angle attachment lens mounted and the same relationship but with the wide-angle attachment lens mounted in FIG. 1.

The AF processing routine is followed by a zoom processing routine (step S104) which performs compensation function to keep a focused state during zooming operation. In the zoom processing routine, the zoom driving direction and speed of the focus-compensation lens 105 are calculated to follow the cam locus as shown in FIG. 2(a). The zoom processing routine will be discussed further later.

The zoom processing routine is followed by a driving direction and speed selecting routine of the variator lens 102 (step S105). In this routine, in accordance with the of forced movement operation with the wide-angle attachment lens mounted, AF mode (automatic focusing mode) operation, and zooming operation, driving direction and speed are selected from driving direction and speed of the variator lens 102 and driving direction and speed of the focus-compensation lens 105, determined in steps S103 and S104.

The driving direction and speed-selecting routine for the focus-compensation lens 105 is followed by a focus, zoom and motor driving control routine (step S106). In this routine, in response to the selected driving direction and speed of the variator lens 102 and the selected driving direction and speed of the focus-compensation lens 105, the control signal for the variator lens driver 117 and the control signal for the focus-compensation lens driver 119 are generated to control the variator lens 102 and the focus-compensation lens 105 in driving or stopping operation.

In succession to the focus, zoom and motor driving control routine, the processing returns back to step S102 to be repeated. The above series of steps are performed in synchronism with a vertical synchronization interval. The start of step S102 waits for a next vertical synchronizing signal.

Figure 7:
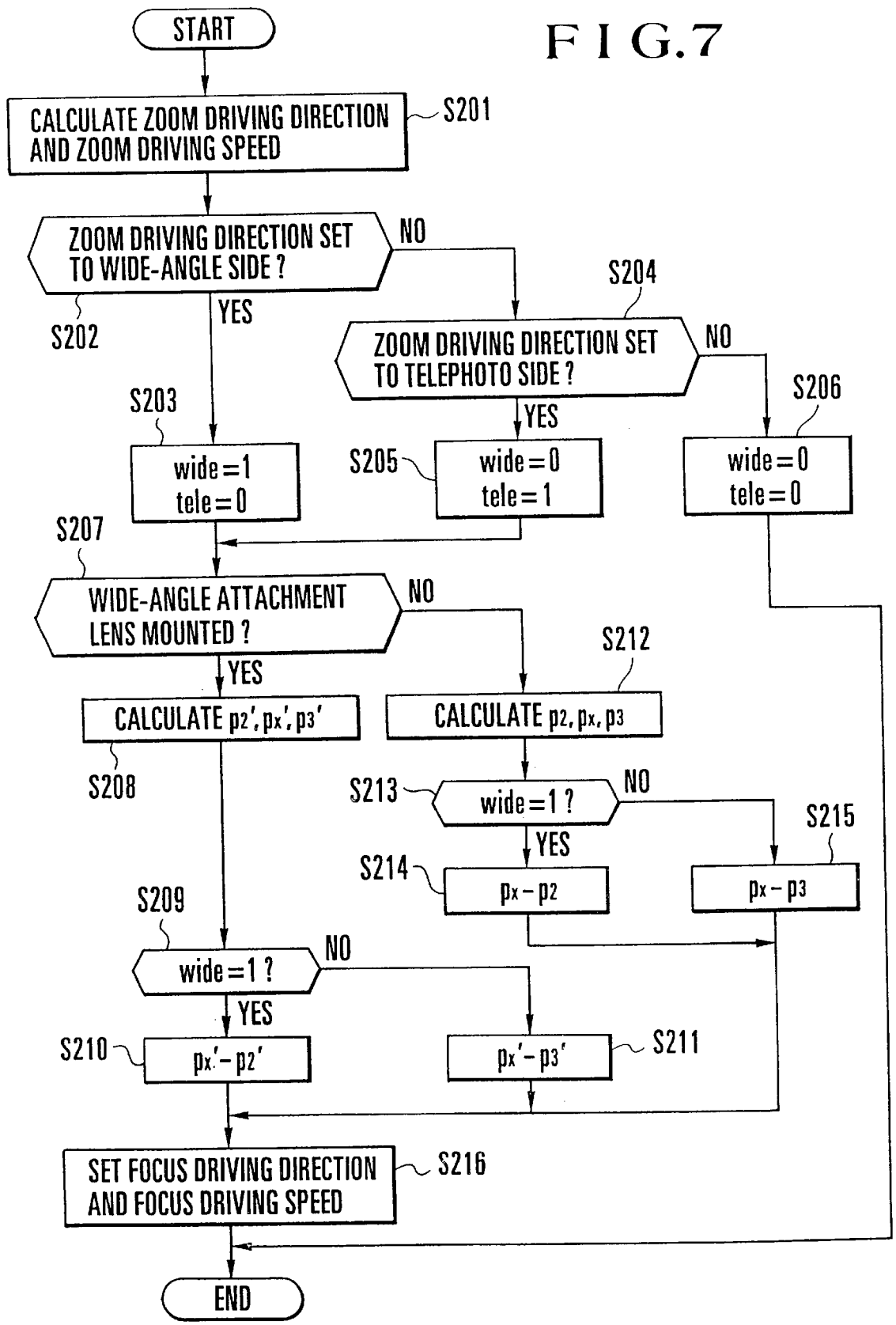
FIG. 7 is a flow diagram showing the zooming control operation of the camera of FIG. 5.
Figure 8A:
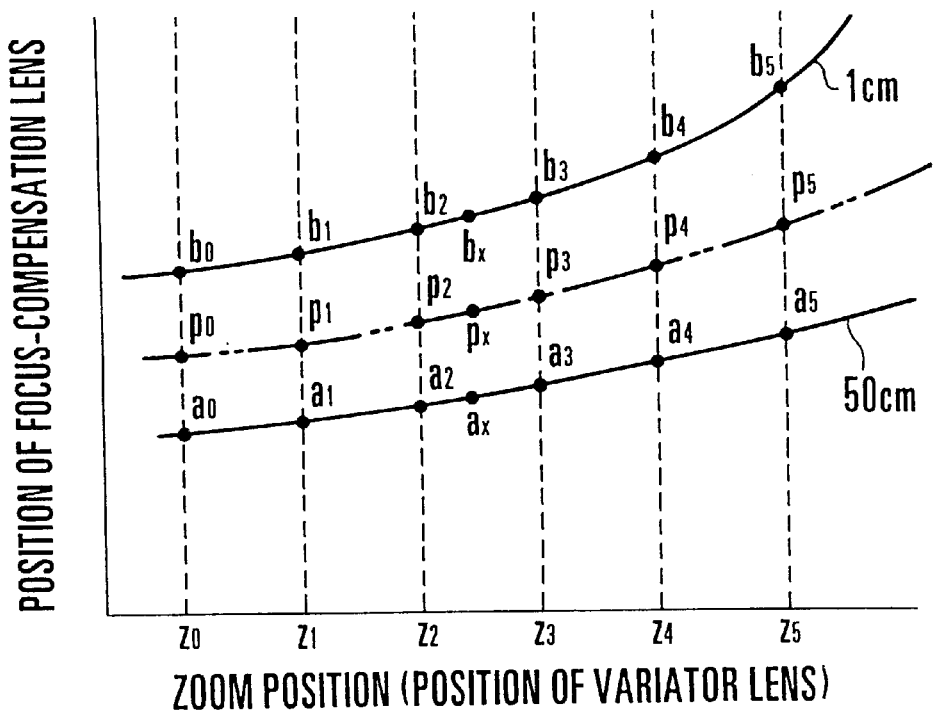
FIGS. 8(a) and 8(b) illustrate the relationship between the focal length (the position of the variator lens) of the zoom lens unit and the position of the focus-compensation lens with no wide-angle attachment lens mounted and the same relationship but with the wide-angle attachment lens mounted in FIG. 5.
Figure 8B:
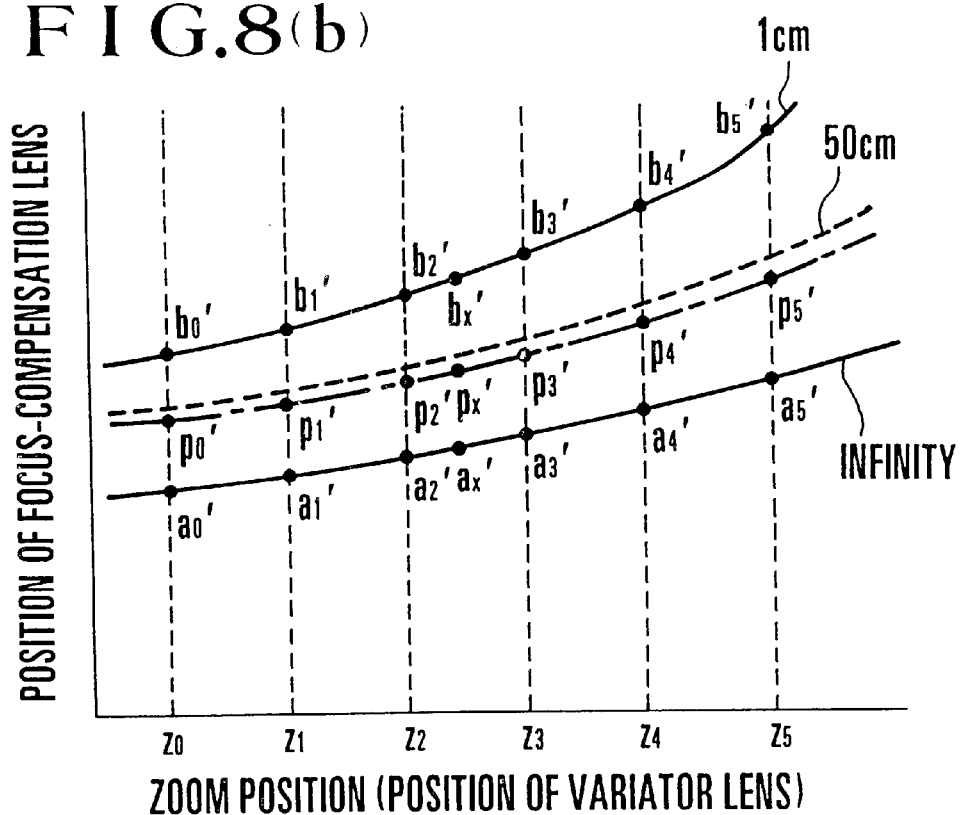

Referring to drawings, the zooming operation in the camera according to this embodiment is discussed. FIG. 7 is the flow diagram showing the zooming operation of the camera of FIG. 5. FIGS. 8(a) and 8(b) illustrate the relationship between the focal length (the position of the variator lens) of the zoom lens unit and the position of the focus-compensation lens with no wide-angle attachment lens mounted and the same relationship but with the wide-angle attachment lens mounted in FIG. 5. FIGS. 9(a) and 9(b) are tables, each listing representative values representing the relationship between the focal length (the position of the variator lens) of the zoom lens unit and the position of the focus-compensation lens with no wide-angle attachment lens mounted and the same relationship but with the wide-angle attachment lens mounted in FIG. 5.

In the zoom processing routine (step S104 in FIG. 6), a zoom driving direction and a zoom driving speed are determined from the zooming operation information of the zoom switch unit 126 input from the system controller 124 as shown in FIG. 7 (step S201). Specifically, the zooming operation information of the zoom switch unit 126 is analog-to-digital converted before being fed to the AF microcomputer 115, and the zoom driving direction and the zoom driving speed are calculated based on the determination of whether a value of the zooming operation information is greater than or smaller than a reference value and the magnitude of difference (absolute value) between both values.

In succession, a determination is made of whether the zoom driving direction is to the wide-angle side or not (step S202). When the zoom driving direction is set to the wide-angle side, zoom driving direction bits are set as follows: wide=1 and tele=0. The zoom driving direction to the wide-angle side is thus set (step S203).

Next, a determination is made of whether the wide-angle attachment lens 121 is mounted or not based on the detection signal from the wide-angle attachment lens mounting detecting switch 123 (step S207). When the wide-angle attachment lens 121 is mounted, and two positions p2' and p3' next to the current position px' of the focus-compensation lens 105 are determined from curves, in FIG. 8(b), representing the relationship between the focal length (the position of the variator lens 102) of the zoom lens unit and the position of the focus-compensation lens 105 with the wide-angle attachment lens 121 mounted and also from the table, in FIG. 9(b), listing representative values representing the relationship between the focal length (the position of the variator lens 102) of the zoom lens unit and the position of the focus-compensation lens 105 with the wide-angle attachment lens 121 mounted (step S208). The positions p2', p3' of the focus-compensation lens 105 are determined based on the interior division ratio of ax', px', and bx', which are determined by substituting z2, z3, a2', a3', b2', and b3' in Equations (2) and (3). It should be noted that a1' (a1' in FIG. 8(b))=Bk1 (in FIG. 9(b)), a2'=Bk2, b1'=Bk+11, b2'=Bk+12. Representative values that define the above curves and above-mentioned table are stored in the AF microcomputer 115.

In succession to the determination of p2', px' and p3', a determination is made of whether the zoom driving direction bit wide is set to "1" or not (step S209). A setting of "1" for the zoom driving direction bit wide means that the zoom driving direction is to the wide-angle side. When "1" is set for the zoom driving direction bit wide, the positional difference between the current position px' and the position p2' to be followed is calculated (step S210). The driving speed of the focus-compensation lens 105 to keep focused state is determined from the above positional difference and the time the variator lens 102 requires to travel from zx to z2, and the driving speed is set and the driving direction is set to the wide-angle side (step S216).

When "1" is not set for the zoom driving direction bit wide, the positional difference between the current position px' and the position p3' to be followed is calculated (step S211). The driving speed of the focus-compensation lens 105 to keep focused state is determined from the above positional difference and the time the variator lens 102 requires to travel from zx to z3, and the driving speed is set, and the driving direction is set to the telephoto side (step S216).

When the zoom driving direction is not set to the wide-angle side (step S202), a determination is made of whether the zoom driving direction is set to the telephoto side or not (step S204). When the zoom driving direction is set to the telephoto side, the zoom driving direction bits are wide=0, tele=1, indicative of the zoom driving direction to the telephoto side. Thus, the zoom driving to the telephoto side is set (step S205). When the zoom driving direction is not set to the telephoto side, the zoom driving bits are wide=0, tele=0, and zooming operation is disabled (step S206).

When the wide-angle attachment lens 121 is not mounted (step S207), and two positions p2 and p3 next to the current position px of the focus-compensation lens 105 are determined from curves, in FIG. 8(a), representing the relationship between the focal length (the position of the variator lens 102) of the zoom lens unit and the position of the focus-compensation lens 105 with no wide-angle attachment lens 121 mounted and also from the table, in FIG. 9(a), listing representative values representing the relationship between the focal length (the position of the variator lens 102) of the zoom lens unit and the position of the focus-compensation lens 105 with no the wide-angle attachment lens 121 mounted (step S212). The positions p2, p3 of the focus-compensation lens 105 are determined based on the interior division ratio of ax, px, and bx, which are determined by substituting z2, z3, a2, a3, b2, and b3 in Equations (2) and (3). It should be noted that a1 (in FIG. 8(a))=Bk1 (in FIG. 9(a)), a2=Ak2, b1=Ak+11, b2=Ak+12. Representative values that define the above curves and above-mentioned table are stored in the AF microcomputer 115.

In succession to the determination of p2, px and p3, a determination is made of whether the zoom driving direction bit wide is set to "1" or not (step S213). When "1" is set for the zoom driving direction bit wide, the positional difference between the current position px and the position p2 to be followed is calculated (step S214). The driving speed of the focus-compensation lens 105 to keep focused state is determined from the above positional difference and the time the variator lens 102 requires to travel from zx to z2, and the driving speed is set and the driving direction is set to the wide-angle side (step S216).

When "1" is not set for the zoom driving direction bit wide, the positional difference between the current position px and the position p3 to be followed is calculated (step S215). The driving speed of the focus-compensation lens 105 to keep focused state is determined from the above positional difference and the time the variator lens 102 requires to travel from zx to z3, and the driving speed is set, and the driving direction is set to the telephoto side (step S216).

The driving operation of the zoom lens unit 100 based on the driving bits (wide, tele) and the zoom driving speed will be discussed in detail.

The AF microcomputer 115 provides to the variator lens motor driver 117 a motor rotational frequency signal responsive to the zoom driving speed and a motor rotational direction signal responsive to the zoom driving bit. In response to the motor rotational direction signal, the variator lens driver 117 sets up the exciting phase of the 4-phase stepping motor for forward rotation or reverse rotation. Also, in response to the rotational frequency signal, the variator lens driver 117 varies a voltage (or a current) applied to the 4-phase motor exciter. The variator lens motor 118 is thus controlled in terms of its rotational direction and rotational frequency. Under such a controlling, the variator lens motor 118 rotates driving the variator lens 102.

The driving operation of the variator lens 102 has been discussed. The focus-compensation lens 105 is also driven in the same manner in this embodiment.

As described above, when the wide-angle attachment lens 121 is mounted, the driving speed of the focus-compensation lens 105 to follow the focused position that shifts in accordance with the shifting of the variator lens 102 is determined based on the stored data. During zooming operation, focused state is maintained with the wide-angle attachment lens 121 mounted and thus fine adjustment of field of view is performed. By detaching the wide-angle attachment lens 121 from the zoom lens unit 100, a magnification ranging from 1× to 12× s gained. Therefore, a magnification setting over a range continuous from 0.7× to 12× is possible while focused state is maintained. The operator thus can set a field of view as intended.

By arranging representative values in tabled data that match the minimum object distance data with the wide-angle attachment lens mounted as a standard, focusable minimum object distance data are stored for both cases where the wide-angle attachment lens is detached and mounted.

Second Embodiment

Referring to drawings, a second embodiment of the present invention is discussed.

The second embodiment is a modified version of the first embodiment in the process algorithm in the AF microcomputer 115.

In the first embodiment, the table bearing representative values of follow curves with no wide-angle attachment lens mounted and the table bearing representative values of follow curves with the wide-angle attachment lens mounted are separately stored. This embodiment is provided with an arrangement of reducing memory capacity, and its circuit configuration remains unchanged from that of the first embodiment.

The zooming operation in this embodiment is discussed referring to drawings.

Figure 10:
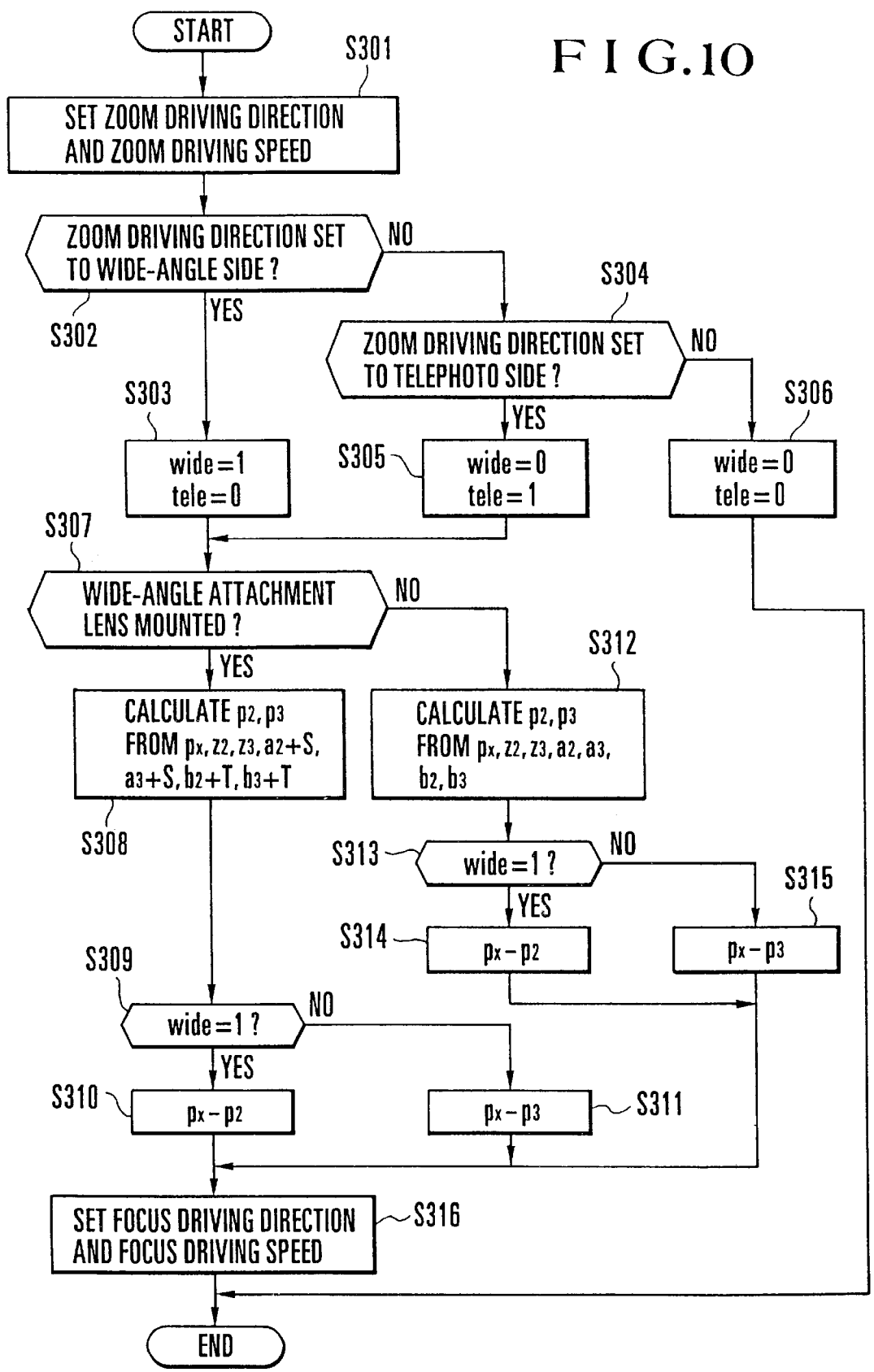
FIG. 10 is a flow diagram showing the zooming operation of a second embodiment of the camera according to the present invention.
Figure 11:
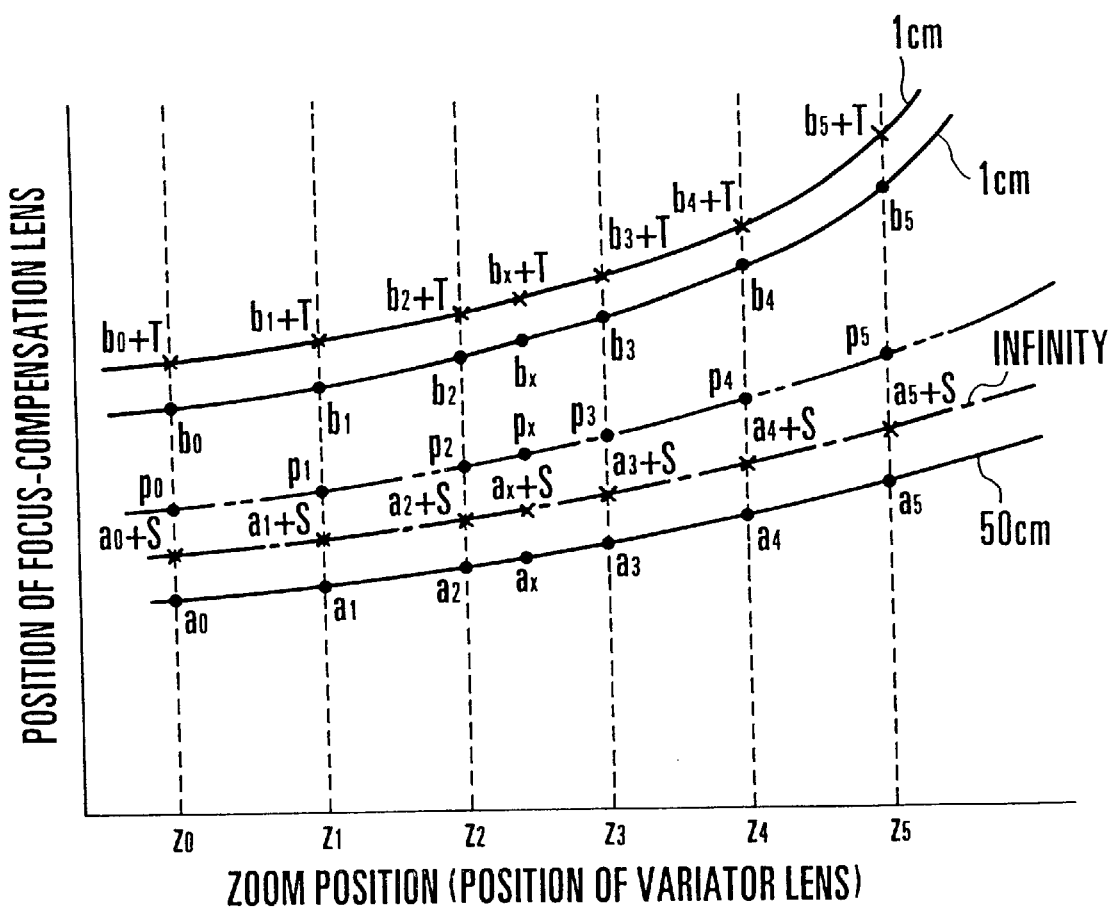
FIG. 11 illustrates the relationship between the focal length (the position of the variator lens) of the zoom lens unit and the position of the focus-compensation lens with no wide-angle attachment lens mounted and the same relationship but with the wide-angle attachment lens mounted.

FIG. 10 is the flow diagram showing the zooming operation of the second embodiment of the camera according to the present invention. FIG. 11 illustrates the relationship between the focal length (the position of the variator lens) of the zoom lens unit and the position of the focus-compensation lens with no wide-angle attachment lens mounted and the same relationship but with the wide-angle attachment lens mounted with reference to FIG. 10.

In the zoom processing routine (step S104 in FIG. 6), a zoom driving direction and a zoom driving speed are determined from the zooming operation information of the zoom switch unit 126 input from the system controller 124 (step S301). Specifically, the zooming operation information of the zoom switch unit 126 is analog-to-digital converted before being fed to the AF microcomputer 115, and the zoom driving direction and the zoom driving speed are calculated based on the determination of whether a value of the zooming operation information is greater than or smaller than a reference value and the magnitude of difference (absolute value) between both values.

In succession, a determination is made of whether the zoom driving direction is to the wide-angle side or not (step S302). When the zoom driving direction is set to the wide-angle side, zoom driving direction bits are set as follows: wide=1 and tele=0. The zoom driving direction to the wide-angle side is thus set (step S303).

Next, a determination is made of whether the wide-angle attachment lens 121 is mounted or not based on the detection signal from the wide-angle attachment lens mounting detecting switch 123 (step S307). When the wide-angle attachment lens 121 is mounted, and two positions p2 and p3 next to the current position px of the focus-compensation lens 105 are determined from curves, in FIG. 11, representing the relationship between the focal length (the position of the variator lens 102) and the position of the focus-compensation lens 105 with the wide-angle attachment lens 121 mounted (step S308). The positions p2, p3 of the focus-compensation lens 105 are determined based on the interior division ratio of ax+S, px, and bx+T, wherein ax+S and bx+T are determined by substituting z2, z3, a2+S, a3+S, b2+T, and b3+T in Equations (2) and (3). Representative values that define the above curves are stored in the AF microcomputer 115. S and T are offset values to the curves with no wide-angle attachment lens mounted. Therefore, by adding these offset values, the curves with the wide-angle attachment lens mounted result.

In succession to the determination of p2, px and p3, a determination is made of whether the zoom driving direction bit wide is set to "1" or not (step S309). When "1" is set for the zoom driving direction bit wide, the positional difference between the current position px and the position p2 to be followed is calculated (step S310). The driving speed of the focus-compensation lens 105 to keep focused state is determined from the above positional difference and the time the variator lens 102 requires to travel from zx to z2, and the driving speed is set and the driving direction is set to the wide-angle side (step S316).

When "1" is not set for the zoom driving direction bit wide, the positional difference between the current position px and the position p3 to be followed is calculated (step S311). The driving speed of the focus-compensation lens 105 to keep focused state is determined from the above positional difference and the time the variator lens 102 requires to travel from zx to z3, and the driving speed is set, and the driving direction is set to the telephoto side (step S316).

When the zoom driving direction is not set to the wide-angle side (step S302), a determination is made of whether the zoom driving direction is set to the telephoto side or not (step S304). When the zoom driving direction is set to the telephoto side, the zoom driving direction bits are wide=0, tele=1, indicative of the zoom driving direction to the telephoto side. Thus, the zoom driving to the telephoto side is set (step S305). When the zoom driving direction is not set to the telephoto side, the zoom driving bits are wide=0, tele=0, and zooming operation is disabled (step S306).

When the wide-angle attachment lens 121 is not mounted (step S307), and two positions p2 and p3 next to the current position px of the focus-compensation lens 105 are determined from curves, in FIG. 11, representing the relationship between the focal length (the position of the variator lens 102) and the position of the focus-compensation lens 105 with and without wide-angle attachment lens 121 mounted (step S312). The positions p2, p3 of the focus-compensation lens 105 are determined based on the interior division ratio of ax, px, and bx, wherein ax and bx are determined by substituting z2, z3, a2, a3, b2, and b3 in Equations (2) and (3).

In succession to the determination of p2 and p3, a determination is made of whether the zoom driving direction bit wide is set to "1" or not (step S313). When "1" is set for the zoom driving direction bit wide, the positional difference between the current position px and the position p2 to be followed is calculated (step S314). The driving speed of the focus-compensation lens 105 to keep focused state is determined from the above positional difference and the time the variator lens 102 requires to travel from zx to z2, and the driving speed is set and the driving direction is set to the wide-angle side (step S316).

When "1" is not set for the zoom driving direction bit wide, the positional difference between the current position px and the position p3 to be followed is calculated (step S315). The driving speed of the focus-compensation lens 105 to keep focused state is determined from the above positional difference and the time the variator lens 102 requires to travel from zx to z3, and the driving speed is set, and the driving direction is set to the telephoto side (step S316).

The driving operation of the variator lens 102 has been discussed. The focus-compensation lens 105 is driven in the same manner in this embodiment.

The curve representing the relationship between the focal length (the position of the variator lens 102) and the position of the focus-compensation lens 105 is obtained by adding the offset value, T, to representative values representing the relationship between the focal length (the position of the variator lens 102) and the position of the focus-compensation lens 105 with no wide-angle attachment lens 121 mounted. Thus, a reduced memory capacity demand results.

The method described above works when the curve of the minimum object distance with no wide-angle attachment lens mounted approximates the curve with the wide-angle attachment lens mounted. The curve at the infinity end with the wide-angle attachment lens mounted is obtained by selecting one of the curves with no wide-angle attachment lens, which approximates most closely at the infinity end the curve with the wide-angle attachment lens mounted and by setting representative values of the selected curve to the offset values. Furthermore, by determining offset values that set up a curve equivalent to the curve with the wide-angle attachment lens mounted, focusable minimum object distance is kept regardless of whether the wide-angle attachment lens is mounted or not.

According to the above embodiments of the present invention, with the conversion lens group mounted, the focused position of the focusing lens group relative to the variator lens group is determined while the variator lens group is shifted within the second focal length area. Thus, zooming operation is performed while focused state is kept, and an operator is allowed to set a field of view as he or she intends.

According to the above embodiments of the present invention, the data of the focused position, set according to object distance, of the focusing lens group relative to the variator lens group are made up of first focused position data regarding the first focal length area and second focused position data regarding the second focal length area. The appropriate focused data is thus selected in response to the presence or absence of the conversion lens group.

According to the above embodiments of the present invention, the data of the focused position, set according to object distance, of the focusing lens group relative to the variator lens group are made up of first focused position data regarding the first focal length area and second focused position data regarding the second focal length area are determined based on the first focused position data. The memory required to store the focused position data, predetermined according to object distance, of the focusing lens group relative to the variator lens group is reduced.

According to the above embodiments of the present invention, either the first focused position data or the second focused position data is selected in response to the mounting of the conversion lens group, and the focused position data of the focusing lens group during the shifting of the variator lens group are determined based on the selected first or second focused position data. Therefore, the appropriate focused position is determined in response to the presence or absence of the conversion lens group.

Third Embodiment

A third embodiment of the present invention is now discussed. This embodiment optimizes the zoom speed, namely the driving speed of the variator lens when the wide-angle attachment lens is mounted.

In the lens system constructed as in FIG. 1, the focus-compensation lens 105 has both the compensation function and the focusing function. Therefore, even on the same focal length, the position of the focus-compensation lens 105 is different with object distance to keep an image in focus on the CCD 106.

FIG. 2(a) is a plot of the position of the focus-compensation lens 105, wherein object distance is varied at each focal length to keep an image in focus on the CCD 106 with no wide-angle attachment lens 121 mounted. If, during zooming operation, a locus shown in FIG. 2(a) is selected by object distance to the focus-compensation lens 105 to follow the locus, unfocused state will be prevented.

Figure 2B:
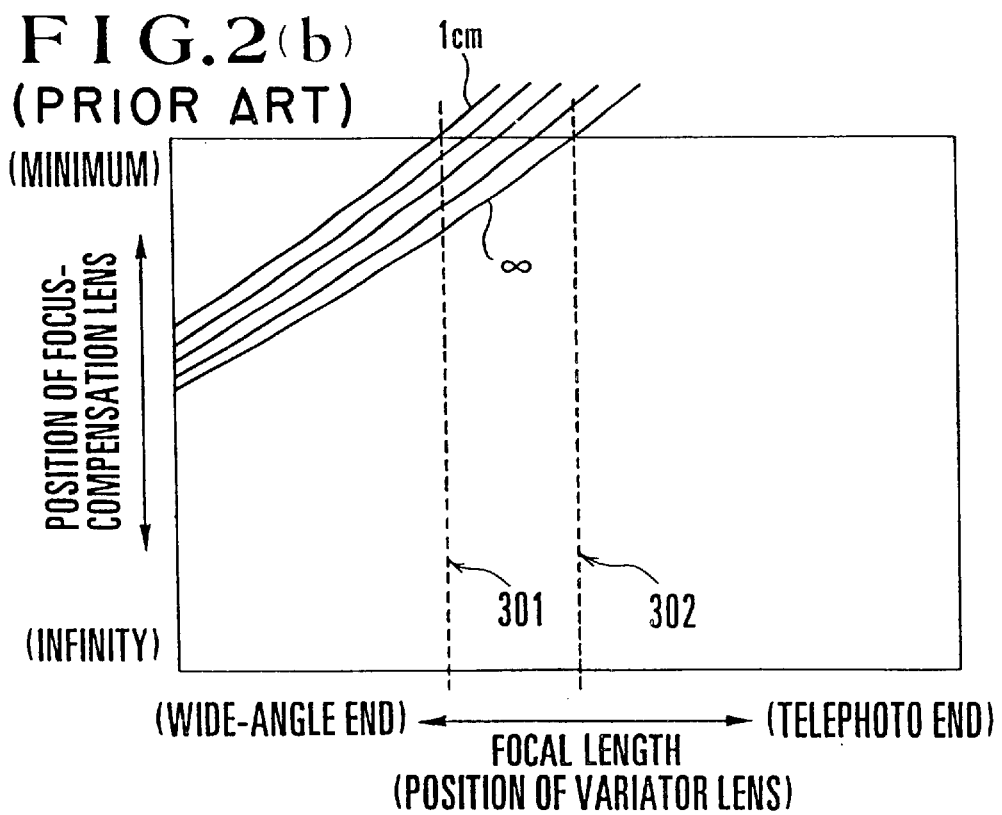
Figure 3:
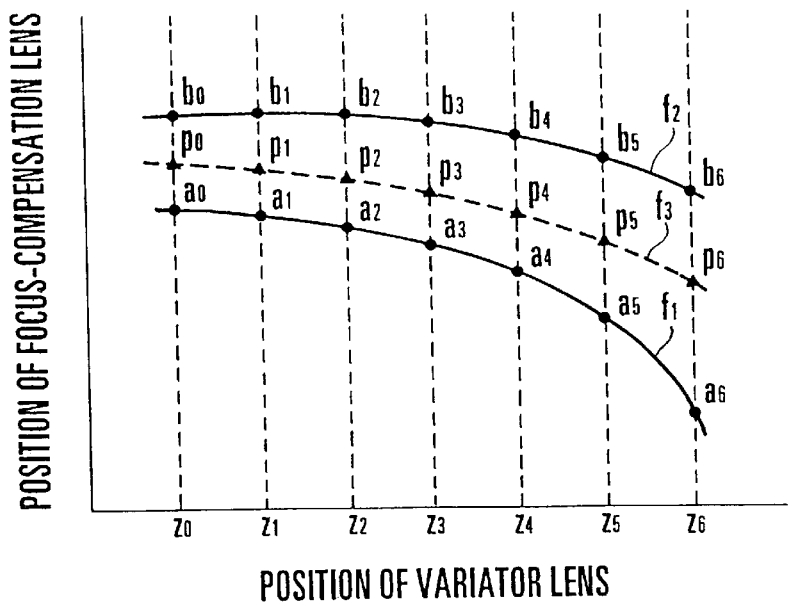
FIG. 3 shows the relationship between the position of the variator lens and the position of the focus-compensation lens with no wide-angle attachment lens mounted in FIG. 1.
Figure 4:
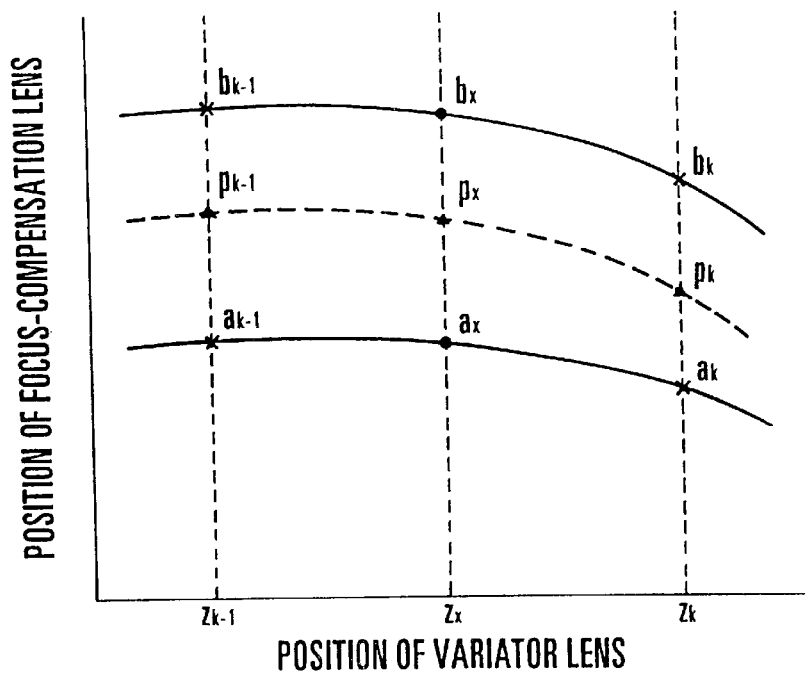
FIG. 4 shows the relationship between the position of the variator lens and the position of the focus-compensation lens with no wide-angle attachment lens mounted in FIG. 1.

When the wide-angle attachment lens 121 is mounted, loci in FIG. 2(a) change as shown in FIG. 2(b). Specifically, when the wide-angle attachment lens 121 is mounted, the loci of all object distances are shifted to the minimum side compared to the loci with no wide-angle attachment lens mounted. Furthermore, the shapes of the loci are changed. To perform zooming operation for zooming without unfocused state, a locus following control different from that with no wide-angle attachment lens mounted must be performed. On the telephoto side relative to a focal length 301 in FIG. 2(b), each locus, beyond the mechanical minimum end of the focus-compensation lens, diverges out of the range of travel of the focus-compensation lens. Focusing is thus impossible. In view of this, the variator lens 102 is conventionally fixed at the wide-angle end to disable zooming operation when the wide-angle attachment lens is mounted.

In zooming-operation within a range from the wide-angle end to 301 in FIG. 2(b), a change in magnification up to 2× is obtained. When the wide-angle attachment lens 121 is mounted, a zooming operation is executed within the range from the wide-angle end to 301 even with the wide-angle attachment lens 121 mounted, as proposed in previous embodiments.

In a so-called inner-focus lens arrangement in FIG. 1, the variator lens is accommodated in the lens barrel, and the driving method of the focus-compensation lens 105 has to be changed for each object distance during the shifting of the variator lens in order to keep focused state in zooming operation. Considering these, it is practically impossible to manually drive the variator lens only, from outside.

It is common practice to dispose an electrical switch externally to set a variator lens driving direction and a variator lens driving speed. In most of camera products, to respond fast view-of-field change, the variator lens driving speed is typically fast enough for the variator lens to travel from the telephoto end to the wide-angle end in 2 seconds when the wide-angle attachment lens is not mounted.

When the wide-angle attachment lens is mounted, however, the range of travel of the variator lens 102 is limited to the range from the wide-angle end to 301 in FIG. 2(b). Under this condition, if the maximum speed of the variator lens 102 is set to be equal to the speed with no wide-angle attachment lens mounted, the time allowed for zooming operation is as short as 1 second, and too short for the position of the variator lens 102 to be adjusted. If zooming operation is performed at the maximum speed during photographing, the field of view changes instantaneously, possibly disorientating the operator.

In an apparatus which offers no such an option which allows an operator to set freely the variator lens driving speed by means of electrical switches, the operator is forced to take a series of operational sequences, i.e. initiating zooming, verifying field of view, adjusting speed, zooming, verifying field of view, and stopping zooming. Definitely, the shorter the time required to travel from one end to the other the better, but within the allowance of the speed at which the operator can duly operate and respond in the course of operational sequences and which does not put the operator under the impression that the speed is slow.

In view of the above, the present embodiment has been developed. Its object is to perform zooming operation in a smooth manner when a focal length modifying lens for modifying the focal length that is determined by the variator lens is inserted.

To achieve the above object, the third embodiment of the present invention comprises a first lens for zooming operation, a second lens for focusing operation, a third lens mounted in a detachable manner for modifying the focal length determined by the first lens, driving means for shifting each of the first and second lens, and control means for controlling the driving means in a manner that allows the driving speed of the first lens to be set slower when the third lens is mounted than when the third lens is not mounted.

Also, in this embodiment, the range of travel of the first lens is set narrower when the third lens is mounted than when the third lens is not mounted.

When the third lens is mounted, the control means controls the driving means in a manner that allows the driving speed of the first lens to be set slower only when it exceeds a predetermined speed.

The third embodiment of the present invention, in another aspect, comprises a first lens for zooming operation, a second lens for focusing operation, a third lens mounted in a detachable manner for modifying the focal length determined by the first lens, input means for specifying the driving speed for the first lens, driving means for shifting each of the first and second lens, and control means for controlling the driving means in a manner that the first lens shifts within the range of travel which is set narrower when the third lens is mounted than when the third lens is not mounted, for controlling the driving means, when the third lens is not mounted, in a manner that the first lens shifts at the specified speed input by the input means and for controlling the driving means, when the third lens is mounted, in a manner that the driving speed of the first lens is set to be slower than the specified speed.

When the third lens is mounted, the control means controls the driving means in a manner that allows the driving speed of the first lens to be set slower than the specified speed only when the specified speed exceeds a predetermined speed.

In the above arrangement, when the range of travel (zooming area) of the first lens is narrowed with the third lens mounted, the driving means is so controlled that the driving speed of the first lens is slower when the third lens is mounted than when the third lens is not mounted. Therefore, the adjustment of the position of the first lens is easily made, alleviating the operator's disorientation in zooming operation. Zooming operation is thus smoothly-performed.

When the range of travel (zooming area) of the first lens is narrowed with the third lens mounted, the driving means is so controlled that the driving speed of the first lens is slower when it exceeds the predetermined speed. Therefore, the adjustment of the position of the first lens is easily made, while preventing the zooming speed at its slow setting from being too slow. This alleviates the operator's disorientation in zooming operation. Zooming operation is thus smoothly performed.

The third embodiment of the present invention is now discussed. The circuit arrangement of the camera of the third embodiment remains essentially unchanged from that shown in the block diagram in FIG. 5. Its description is thus omitted. The present embodiment lies in the form of the zoom switch unit 125 and the process algorithm of the variator lens control by the AF microcomputer 115.

The zoom switch unit 125 comprises a rotary potentiometer having an operational member which may be turned by an operator. A voltage in response to the angle of rotation in the operational member is output. The output voltage of the zoom switch unit 125 read by the system controller 124 is sent to the AF microcomputer 115 via a communication line. The AF microcomputer 115 performs variable speed zooming in response to the output voltage.

The AF microcomputer 115 sends to the system controller 124 the zooming information about the position of the variator lens displaced as a result of zooming operation and driving direction of the variator lens. The system controller 124 controls the character generator 126 based on the zooming information to present photographing information such as zoom information along with the video signal on the LCD 111.

In response to driving commands the AF microcomputer 115 gives for the variator lens 102 and the focus-compensation lens 105, drivers 117 and 119 feed power to the respective lens driving motors 118, 120. The lens driving motors 118 and 120 drive the variator lens 102 and the focus-compensation lens 105, respectively. The wide-angle attachment lens 121 is mounted in a detachable manner by means of a lens sliding mechanism 122 as shown by the dotted line in the figure. The wide-angle attachment lens mounting detecting switch 123 senses whether the wide-angle attachment lens 121 is mounted or not, and the sensed signal is sent to the AF microcomputer 115.

Figure 12:
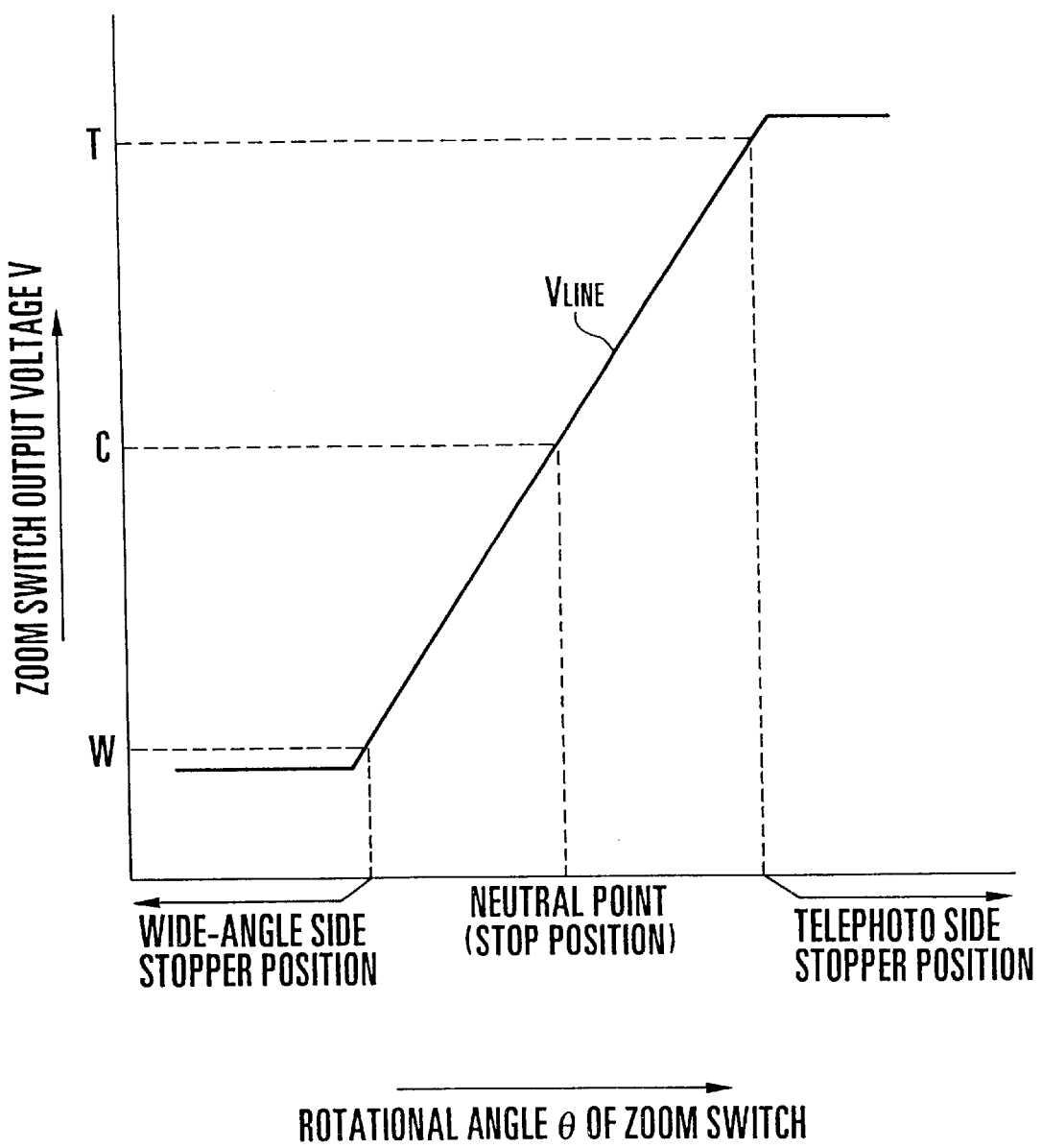
FIG. 12 is an explanatory view showing the output characteristics of a zoom switch unit (potentiometer) of a third embodiment of the present invention.

FIG. 12 is the explanatory view showing the output characteristics of the zoom switch unit 125. The zoom switch unit 125 as already described comprises a rotary potentiometer provided with the operational member. If the operational member remains intact, the sliding brush of the potentiometer is designed to automatically return back to its neutral point (stop position). The angle of rotation of the potentiometer is set, for example, to ±30° with respect to the neutral point. In such a case, stoppers are provided so that the sliding brush may not rotate beyond 30° limits. The process routine in the AF microcomputer 115 is set up so that zooming operation is performed at the maximum speed toward the telephoto side when the sliding brush abuts one stopper through a clockwise rotation of 30°, and zooming operation is performed at the maximum speed toward the wide-angle side when the sliding brush abuts the other stopper through a counterclockwise rotation of 30°.

As shown by VLINE in FIG. 12, the output voltage V of the potentiometer varies in linear proportion to the angle of rotation within the range of rotation of the potentiometer (neutral point±30°). Let C represent the output voltage with the potentiometer at its neutral point, T the output voltage with the potentiometer at its telephoto side, and W the output voltage with the potentiometer at its wide-angle side. In the above setting, to gain the variator lens driving speed SPEED in proportion to the angle of rotation, the following proportional relationship may be used:

$$\text{SPEED} = |(\text{variator lens maximum speed})*(V-C)/2(T-W)| \quad (4)$$

The variator lens driving direction is determined by the calculation (V−C) For a positive result, telephoto side, and for a negative result, wide-angle side.

Figure 13:
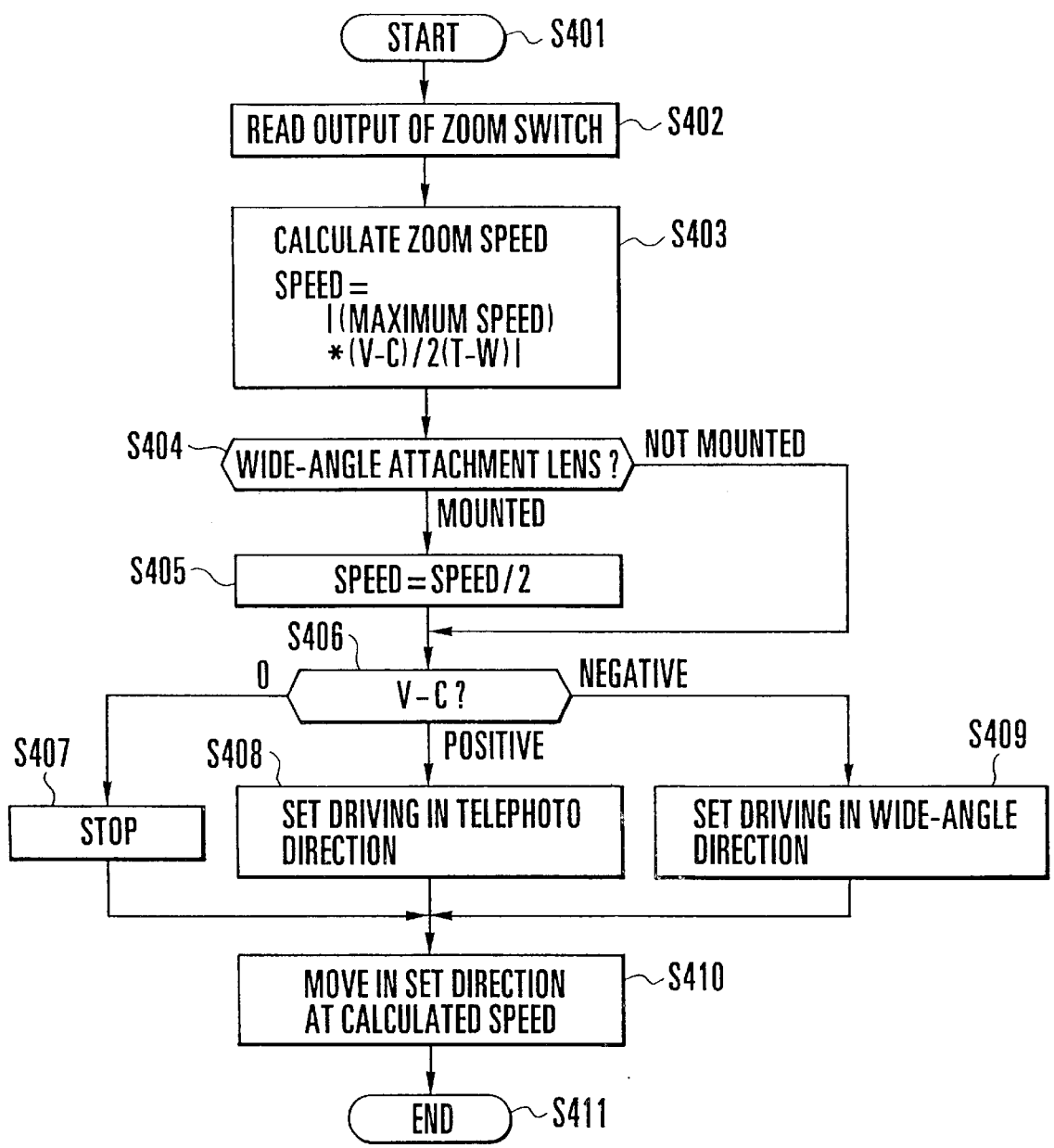
FIG. 13 is a flow diagram showing the operation of an AF microcomputer in the third embodiment of the present invention.

FIG. 13 is the flow diagram showing the driving control of the variator lens 102 when the above zoom switch unit 125 is employed. The process in FIG. 13 is executed on the assumption that C, T, W and variator lens maximum speed in Equation (4) are stored beforehand in the AF microcomputer 115.

In FIG. 13, when the execution of the process starts (step S401), the AF microcomputer 115 receives the output voltage V of the zoom switch unit 125 sent from the system controller 124 (step S402). The system controller 124 continuously analog-to-digital converts the output voltage of the zoom switch unit 125, and sends the resulting digital data to the AF microcomputer 115 via a communication line.

The AF microcomputer 115 computes Equation (4) in response to the output voltage V of the zoom switch unit 125 to determine the variator lens driving SPEED (step S403). Based on the output signal from the wide-angle attachment lens mounting detecting switch 123, the AF microcomputer 115 senses whether the wide-angle attachment lens 121 is mounted or not (step S404). When the wide-angle attachment lens 121 is mounted, the value of SPEED is halved (step S405) and the process proceeds to step S406.

When the determination reveals that the wide-angle attachment lens 121 is not mounted, the process skips step S405 and proceeds to step S406. At step S406, the driving direction of the variator lens 102 is determined. If (V–C) is "0," a stop is set (step S407).

If (V–C) is positive, the driving direction toward the telephoto side is set (step S408). If (V–C) is negative, the driving direction toward the wide-angle side is set (step S409). Zooming operation starts at the calculated SPEED in the determined direction (step S410), and then a series of sequences are completed (step S411).

Figure 14:
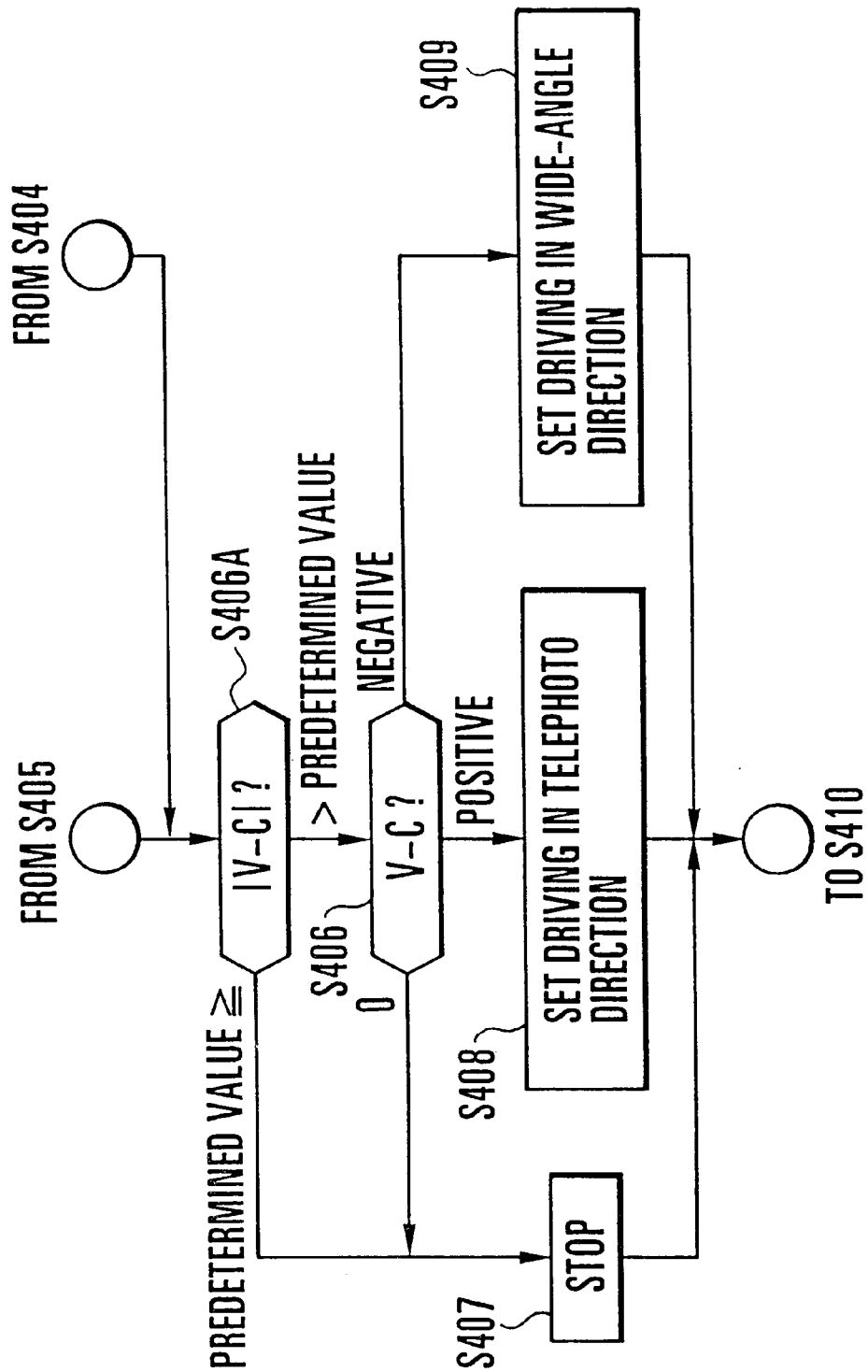
FIG. 14 is a flow diagram showing an alternate example of the operation of the AF microcomputer in the third embodiment of the present invention.

Steps S406 through S409 in FIG. 13 may be replaced with the steps in FIG. 14. Namely, in FIG. 14, step S406A is inserted prior to step S406 in FIG. 13. If |V–C| is equal to or smaller than a predetermined value, the angle of rotation of the potentiometer relative to its neutral point is too small and no zooming direction is set. The process goes to step S407, and the variator lens 102 remains intact.

The above sequence allows a slight allowance with respect to the neutral point, and this avoids an inconvenience that zooming operation is triggered even when the operational member of the potentiometer is casually touched by a finger of the operator. In FIG. 13, the zooming speed with the wide-angle attachment lens 121 mounted is set to half the speed with no wide-angle attachment lens 121 mounted. A different reduction ratio of the zooming speed may be set depending on the arrangement of the optical system in use.

As described above, when the mounting of a conversion lens such as the wide-angle attachment lens 102 limits the range of travel of the variator lens 102, the zooming speed is set to be slower than when no wide-angle attachment lens is mounted, in order to alleviate disorientation and excess sensitivity the operator may suffer.

Fourth Embodiment

Figure 15:
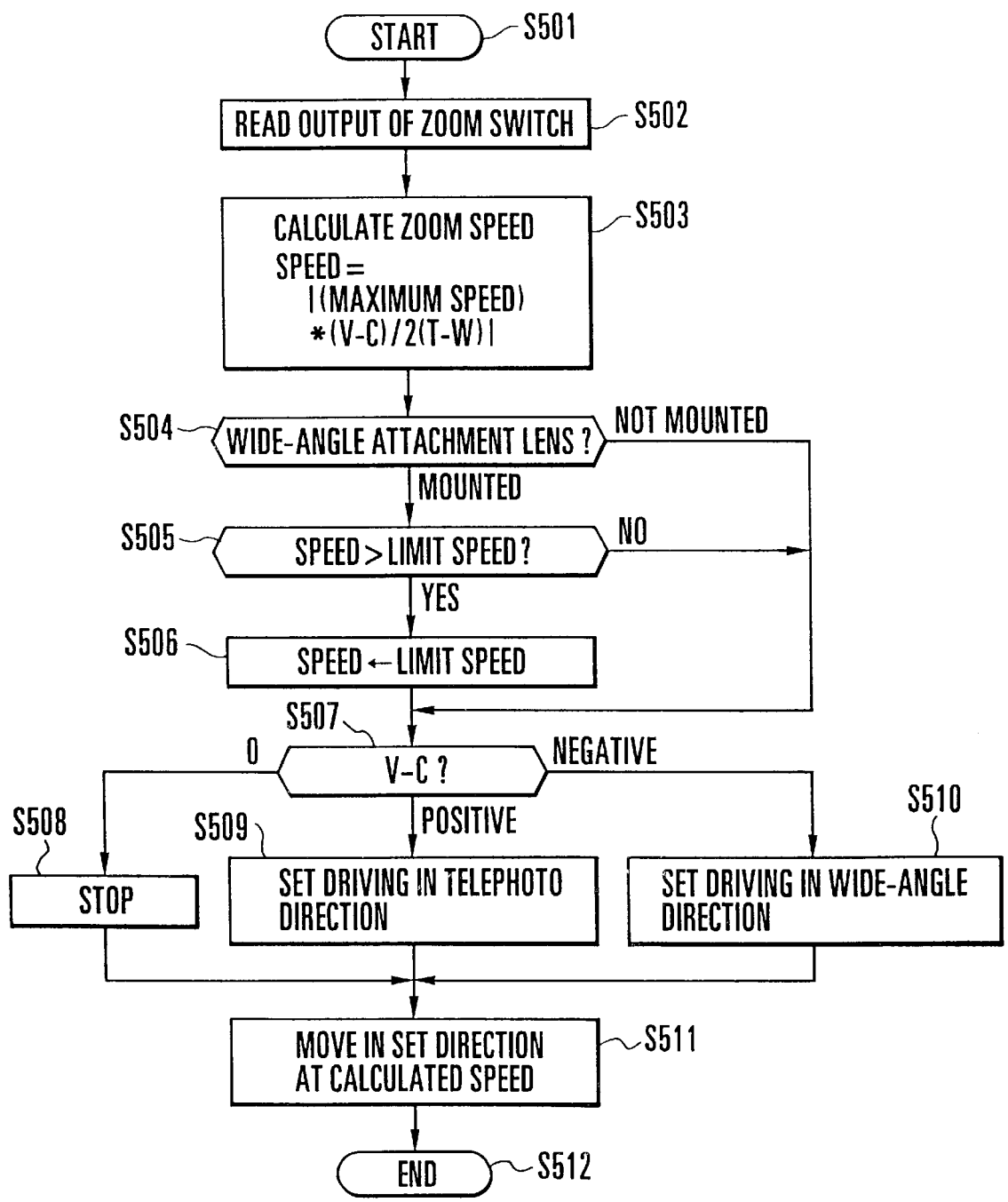
FIG. 15 is a flow diagram showing the operation of an AF microcomputer in a fourth embodiment of the present invention.

FIG. 15 is the flow diagram showing the driving control of the variator lens 102 according to a fourth embodiment of the present invention.

The difference between the processes in FIG. 13 and FIG. 15 is as follows. In FIG. 13, when the wide-angle attachment lens 121 is mounted, a speed reduction ratio of 1/2 (or any other fixed reduction ratio) is commonly applied to all the zooming speed. In this embodiment, however, a reduction is applied to the fast speed range of the zooming speed rather than the slow-speed range of the zooming speed.

In FIG. 15, when the execution of the process starts (step S501), the AF microcomputer 115 receives the output voltage V of the zoom switch unit 125 sent from the system controller 124 (step S502).

The AF microcomputer 115 computes Equation (4) in response to the output voltage V of the zoom switch unit 125 to determine the variator lens driving or zooming SPEED (step S503). Based on the output signal from the wide-angle attachment lens mounting detecting switch 123, the AF microcomputer 115 senses whether the wide-angle attachment lens 121 is mounted or not (step S504).

When the wide-angle attachment lens 121 is mounted, a determination is made of whether the calculated SPEED at step S503 is greater than a LIMIT SPEED or not (step S505). When the calculated SPEED exceeds the LIMIT SPEED, the LIMIT SPEED substitutes for the value of the calculated SPEED (step S506). The process goes to step S507. When the calculated SPEED is not greater than the LIMIT SPEED, the process goes to step S507 without the above substitution.

When step S504 reveals that the wide-angle attachment lens 121 is not mounted, the process goes to step S507 with steps S505 and S506 skipped. At step S507, the driving direction of the variator lens 102 is determined. If (V–C) is "0," a stop is set (step S508). If (V–C) is positive, the driving direction toward the telephoto side is set (step S509). If (V–C) is negative, the driving direction toward the wide-angle side is set (step S510). Zooming operation starts at the calculated SPEED in the determined direction (step S511), and then a series of sequences are completed (step S512).

The zooming speed at its slow-speed range is set to be equal to the zooming speed with the wide-angle attachment lens mounted. The above process thus resolves the disadvantage that the zooming speed at its slow-speed range is too slow, while imposing the limitation on the zooming speed on its maximum value or near maximum values only.

Also, in this embodiment, the steps in FIG. 14 may be substituted as already described in connection with the third embodiment. If |V–C| is equal to or smaller than a predetermined value, the angle of rotation of the potentiometer relative to its neutral point is too small and no zooming direction is set. A slight allowance is provided with respect to the neutral point, and this avoids an inconvenience that zooming operation is triggered even when the operational member of the potentiometer is casually touched by a finger of the operator.

Fifth Embodiment

As described above, when the mounting of the conversion lens such as the wide-angle attachment lens 121 limits the range of the variator lens, the zooming speed is set to be slower than when no wide-angle attachment lens is mounted in order to alleviate the user's disorientation and excess sensitivity. As understood from the description with reference to FIGS. 13, 14, and 15, the following information is required to perform the above processes:

(1) Information for verifying that the wide-angle attachment lens 121 is mounted.

(2) C (output voltage at the neutral point), T (output voltage at the telephoto end), and W (output voltage at the wide-angle end)

(3) Zoom switch unit output V

Given the above three items of information, the processes in FIGS. 13, 14 and 15 remain workable even if any other type of the zoom switch unit output is used.

Figure 16:
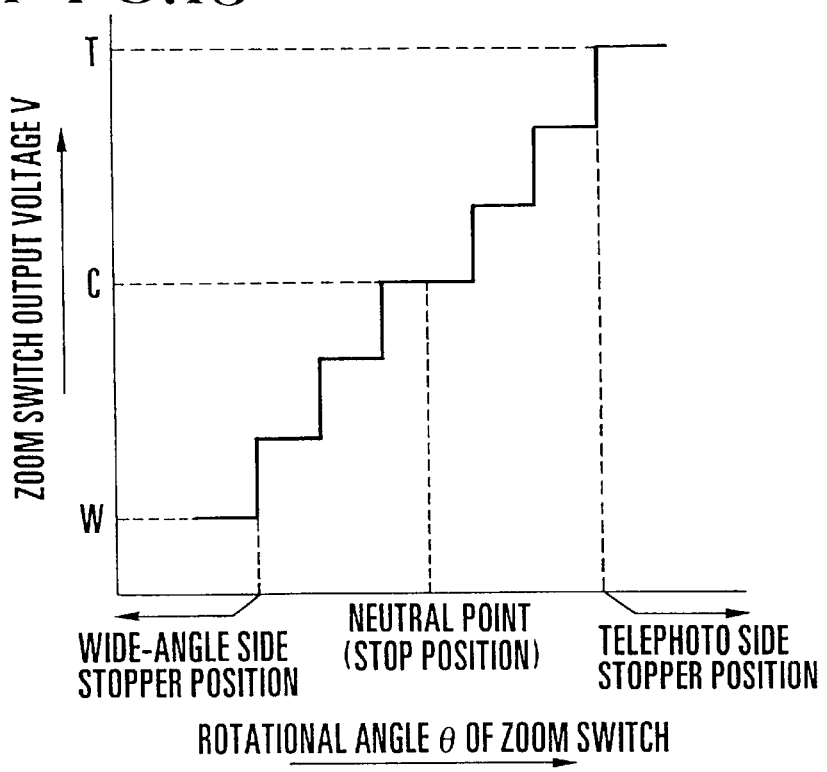
FIG. 16 is an explanatory view showing the output characteristics of a zoom switch unit (potentiometer) of a fifth embodiment of the present invention.
Figure 17:
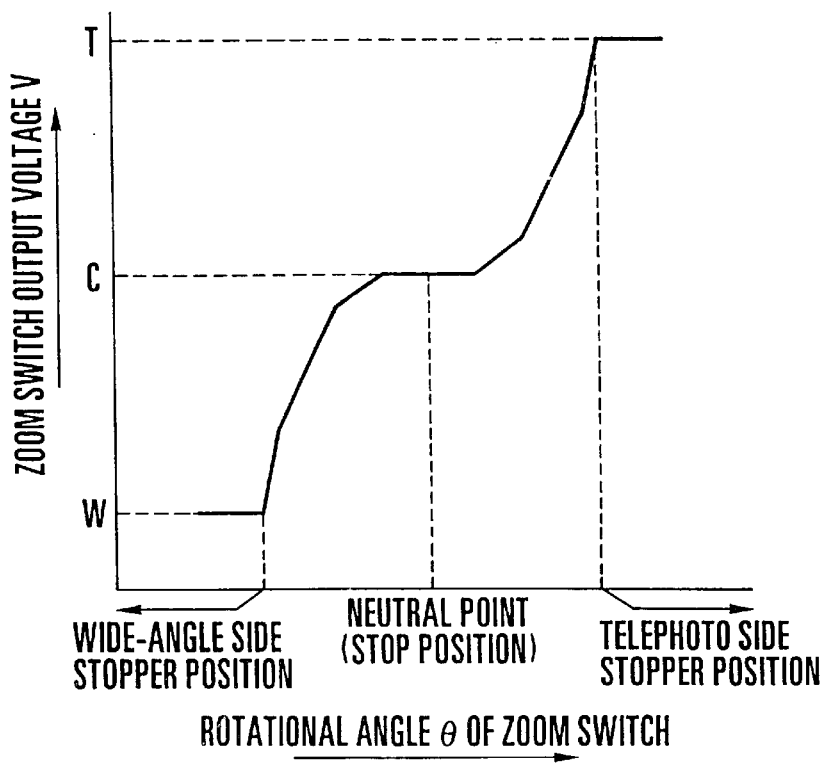
FIG. 17 is an explanatory view showing other output characteristics of the zoom switch unit (potentiometer) of the fifth embodiment of the present invention.

FIG. 16 illustrates the output characteristics of the zoom switch unit which allows any of the three speeds to be selected. FIG. 17 illustrates the output characteristics of the zoom switch unit, wherein the output voltage is non-linear to the angle of rotation of the operational member of the potentiometer. In both cases, the three items of information are provided, and the processes of FIGS. 13, 14 and 15 are directly applicable.

As described above, according to the third to fifth embodiments, when the mounting of the conversion lens such as the wide-angle attachment lens 121 limits the range of the variator lens, the zooming speed is set to be slower than when no wide-angle attachment lens is mounted. Thus, zooming operation is smoothly performed and the user's disorientation and excess sensitivity are controlled.

Sixth Embodiment

A sixth embodiment of the present invention is now discussed.

When the wide-angle attachment lens 121 is mounted, the curves representing the relationship, according to object distance, between the focal length (the position of the variator lens) and the position of the focus-compensation lens are changed from those in FIG. 2(a) to those in FIG. 2(b). In FIG. 2(b), if the focal length exceeds a limit 301, the curves representing the relationship, according object distance, between the focal length and the position of the focus-compensation lens 105 diverge out of the focusable focal length area. If the focal length is kept to within the limit 301, namely, the focal length is set to any value closer to the wide-angle side, focus adjustment by means of the focus-compensation lens 105 remains workable. If the focal length exceeds the limit 301, however, namely, the focal length is set to any value closer to the telephoto side, focus adjustment by means of the focus-compensation lens 105 is impossible. To cope with this problem, the variator lens 102 is moved until the focal length is set to be closer to the wide-angle side, and is fixed there. Therefore, the variator lens 102 is fixed at such a predetermined position, and zooming operation is disabled when the wide-angle attachment lens 121 is mounted.

When the zooming operation is disabled with the wide-angle attachment lens 121 mounted, however, the magnification of the zoom lens unit 100 with the wide-angle attachment lens 121 is fixed. A fine adjustment of field of view by modifying slightly the magnification of the zoom lens unit 100 with the wide-angle attachment lens 121 is not possible, and a user cannot compose a picture as intended.

For example, assuming that the magnification of the zoom lens unit 100 is set to a range from 1× to 12×, and the magnification of the zoom lens unit 100 with the wide-angle attachment lens 121 mounted is set to a range from 0.7× to 1×, the disabling of the zooming operation at the mounting of the wide-angle attachment lens 121 sets the magnification to 0.7×. Although by detaching the wide-angle attachment lens 121, the setting of 1× to 12× is recovered, any magnification setting between 0.7× and 1× cannot be made.

The object of the present embodiment is to provide a camera which enables the zooming operation when the wide-angle attachment lens is mounted, allowing an operator to compose a picture as intended and to recognize the zoom area displayed in an EVE.

To achieve the above object, the embodiment of the present invention comprises a variator lens group for zooming, a focusing lens group for compensating for a change introduced into the focused position as a result of a zooming operation by the variator lens group, a conversion lens group for restricting a focusable shifting area of the variator lens group from a first area to a second area, and control means for shifting the focusable shifting area of the variator lens group from the first area to the second area in response to the mounting of the conversion lens group and for updating a display of the shifted state of the variator lens group from a display corresponding to the first area to a display corresponding to the second area.

According to this embodiment, zooming operation is possible within the focusable focal length area on the wide-angle side even when the wide-attachment lens is mounted. The shifting of the zooming area is indicated to the operator in a timely manner.

The sixth embodiment of the present invention is now discussed.

The circuit arrangement in this embodiment remains essentially unchanged from that shown in FIG. 5. The difference from the previous embodiments lies in the process by the AF microcomputer 115, particularly in the process related to displays.

Figure 18:
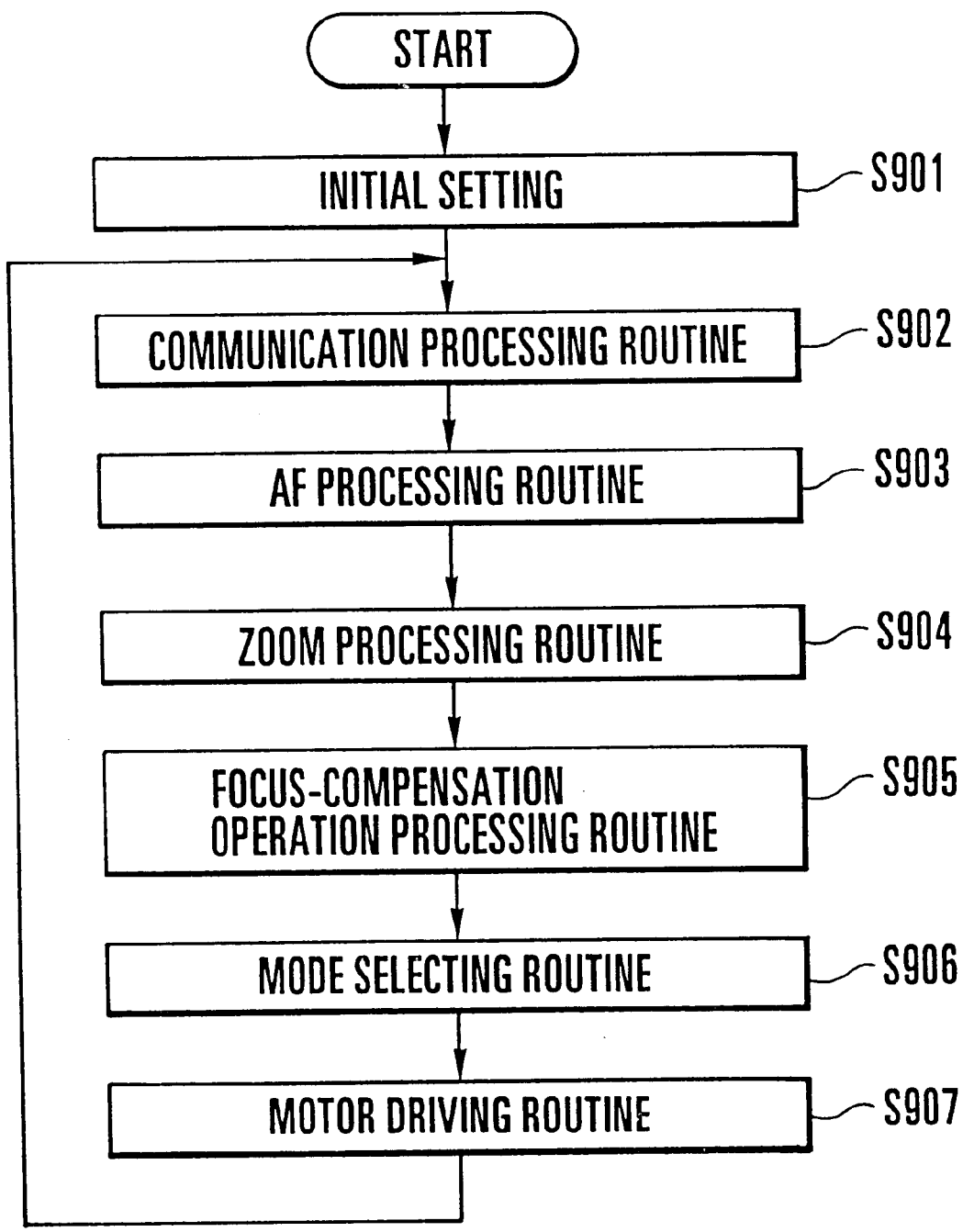
FIG. 18 is a flow diagram showing the control operation of a sixth embodiment of the present invention.

FIG. 18 is the flow diagram showing the control operation of the camera according to this embodiment.

As shown in FIG. 18, the initial setting is performed at the start of the processing (step S901). In the initial setting, the RAM and the variety of ports in the AF microcomputer 115 are initialized.

Then, a communication routine follows (step S902). Exchanged in the communication routine between the AF microcomputer 115 and the system controller 124 are the focal length information of the zoom switch unit 125, the zooming operation information such as zooming direction and focal length the AF microcomputer 115 provides for zooming, the information indicative of the presence or absence of the wide-angle attachment lens 121, and the zoom area shifted according to the presence or absence of the wide-angle attachment lens 121. In response to each signal, the system controller 124 controls the character generator-126 in order to present the necessary pieces of information on the LCD 111.

Figure 20A:
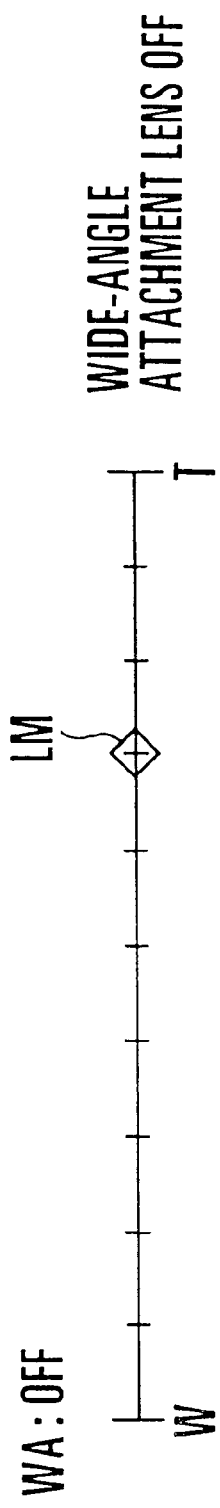
FIGS. 20(a) and 20(b) show respective EVF (Electronic Viewfinder) displays with the wide-angle attachment lens detached and mounted.
Figure 20B:
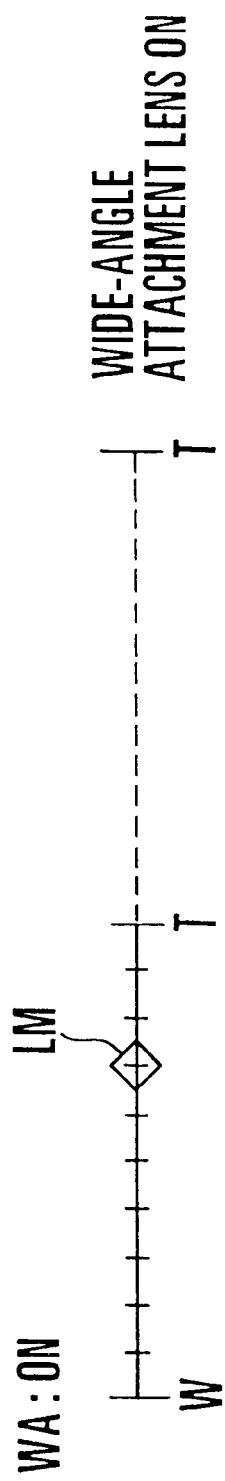

FIGS. 20(a) and 20(b) show zooming areas of the variator lens 102 displayed in an electronic viewfinder (EVF) (LCD 111), for the cases with and without the wide-angle attachment lens 121.

In FIG. 20(a), the wide-angle attachment lens 121 is not mounted. "WA: OFF" is displayed along with the scale between the letter W (wide-angle end) and the letter T (telephoto end). Also displayed is "LM" indicative of the current position of the variator lens (focal length).

When the wide-angle attachment lens 121 is mounted as shown in FIG. 20(b), the zooming area of the variator lens is narrowed. "LM" indicates the current position of the variator lens. "WA: ON" is also displayed. The changed portion of the zooming area of the variator lens (dotted line) is dimmed or erased. This arrangement helps the operator to know correctly the current setting.

The communication routine is followed by the AF processing routine (step S903). In the AF processing routine, automatic focusing is performed based on a change in the AF evaluation signal and processed version of the AF evaluation signal.

The AF processing routine is followed by a zoom processing routine (step S904). The zoom processing routine will be discussed further later.

The zoom processing routine is followed by a focus-compensation operation processing routine (step S905). The focus-compensation operation processing routine keeps focused state in the zooming operation by the variator lens 102. In the focus-compensation operation processing routine, the driving direction and the driving speed of the focus-compensation lens 105 are determined from the curves shown in FIG. 2(*a*).

In succession, a mode selecting routine is performed (step S906). In the mode selecting routine, driving direction and speed to be used are selected from driving direction and speed of the variator lens 102 and driving direction speed of the focus-compensation lens 105, determined in steps S904 and S905 in accordance with each mode of AF (automatic focusing) mode and zooming mode.

The mode selecting routine is followed by a motor driving routine (step S907). In the motor driving routine, the control signal for the variator lens driver 117 and the control signal for the focus-compensation lens driver 119 are generated in response to the selected driving direction and driving speed of the variator lens 102 and the selected driving direction and driving speed of the focus-compensation lens 105. The variator lens 102 and the focus-compensation lens 105 are thus controlled for stopping.

In succession to the mode selecting routine, the process starts over with step S902. The above series of steps are synchronized with the vertical synchronization interval.

Figure 19:
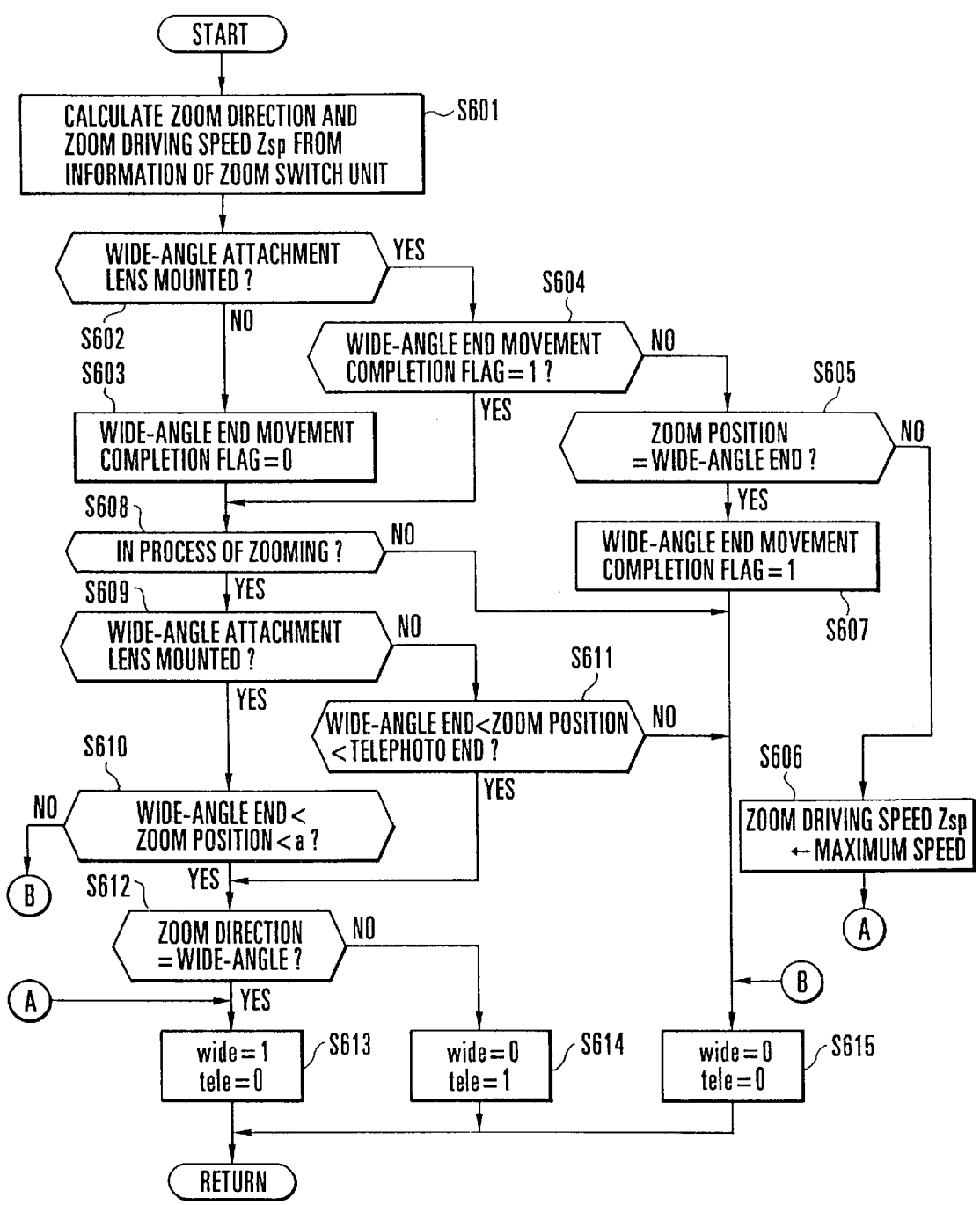
FIG. 19 is a flow diagram showing the zooming operation of the sixth embodiment of the present invention.

The zooming operation control in the camera of the present embodiment is discussed referring to drawings. FIG. 19 is the flow diagram showing the zooming operation control of the camera of the present embodiment.

In the zoom processing routine (step S904 in FIG. 18), the zoom driving direction and speed Zsp are calculated from the information of the zoom switch unit 126 from the system controller 124 (step S601).

In succession, a determination is made of whether the wide-angle attachment lens 121 is mounted or not (step S602). When the wide-angle attachment lens 121 is not mounted, a wide-angle end movement completion flag is set to "0" (step S603), and a determination is made of whether the zooming operation is in progress or not (step S608).

When the zooming operation is in progress, a determination is made of whether the wide-angle attachment lens 121 is mounted or not (step S609). When the wide-angle attachment lens 121 is mounted, a determination is made of whether the position of the variator lens 102 is within the zoom area with the wide-angle attachment lens mounted (step S610). This zoom area is the second area already described. When the position of the variator lens 102 is within the zoom area with the wide-angle attachment lens 102 mounted, a determination is made of whether the zooming direction is toward the wide-angle end or not (step S612).

When the zooming direction is toward the wide-angle side, the zoom driving direction bits are set as follows: wide=1, tele=0. The zoom driving direction is thus set to the wide-angle side (step S613).

When the zooming direction is not toward the wide-angle side (step S612), the zoom driving direction bits are set as follows: wide=0, tele=1. The zoom driving direction is thus set to the telephoto side (step S614).

When step S608 reveals that the zooming operation is not in progress, or when step S610 reveals that the position of the variator lens 102 is not within the zoom area with the wide-angle attachment lens 121 mounted, the zoom driving direction bits are set as follows: wide=0, tele=0. This disables zooming driving (step S615).

When step S609 reveals that the wide-angle attachment lens 121 is not mounted, a determination is made of whether the position of the variator lens 102 is within the normal area (when the wide-angle attachment lens 121 is not mounted) (step S611). This zoom area is the already described first area where the variator lens 102 normally moves. When the position of the variator lens 102 is within the normal zoom area, the process goes to step S612.

When the position of the variator lens 102 is not within the normal zoom area, the zoom driving direction bits wide=0, tele=0 are set. The zoom driving is thus disabled (step S615).

When step S602 reveals that the wide-angle attachment lens 121 is mounted, a determination is made of whether the wide-angle end movement completion flag is set to "1" or not (step S604). When it is set to "1," the process goes to step S608.

When the wide-angle end movement completion flag is not set to "1," a determination is made of whether the position of the variator lens 102 is at the wide-angle end or not (step S605). When the position of the variator lens 102 is at the wide-angle end, the wide-angle end movement completion flag is set to "1" (step S607), and step S615 is executed. When the position of the variator lens 102 is not at the wide-angle end, the zoom driving speed Zsp is set to the maximum speed (step S606) before step S613 is executed.

Discussed next is the driving operation of the zoom lens unit 100 based on the zoom driving bits (wide, tele) and the zoom driving speed Zsp.

The AF microcomputer 115 provides to the variator lens motor driver 117 a motor rotational frequency signal responsive to the zoom driving speed Zsp and a motor rotational direction signal responsive to the zoom driving bits. In response to the motor rotational direction signal, the variator lens driver 117 sets up the exciting phase of the 4-phase stepping motor for forward rotation or reverse rotation. Also, in response to the rotational frequency signal, the variator lens driver 117 varies a voltage (or a current) applied to the 4-phase motor exciter. The variator lens motor 116 is thus controlled in terms of its rotational direction and rotational frequency. Under such a controlling, the variator lens motor 117 rotates driving the variator lens 102.

The driving operation of the variator lens 102 has been discussed. The focus-compensation lens 105 is also driven in the same manner in this embodiment.

As described above, the variator lens 102 is allowed to move within the second area when the wide-angle attachment lens is mounted. Therefore, a magnification setting over a range continuous from 0.7× to 12× is possible while focused state is maintained. The operator thus can set a field of view as finely as intended. By detaching the wide-angle attachment lens 121 from the zoom lens unit 100, a magnification ranging from 1× to 12× is gained. A magnification setting over a range continuous from 0.7× to 12× is possible while focused state is maintained. The operator thus can set a field of view as intended.

The information of the zoom area which is changed in response to the mounting of the wide-angle attachment lens 121 is displayed on the LCD 111. The displayed information helps the operator to know the correct zoom area currently in use, and avoids the operator's possible erroneous recognition in connection with zoom operation in current photographing status.

According to the sixth embodiment, as described above, the movement of the variator lens group for zooming operation is performed selectively within the first area or the second areas Zooming operation is thus allowed with the wide-angle attachment lens mounted. The change of the zoom area of the variator lens is displayed. The operator can thus set a field of view as intended.

Either the firs t area or the second area is selected as the zoom area of the variator lens group for zooming operation in response to the mounting of the conversion lens group such as the wide-angle attachment lens. The variator lens group is allowed to move within the selected area. Thus, unfocusable zooming operation is prevented.

Either the first area or the second area is selected as the zoom area of the variator lens group for zooming operation in response to the mounting of the conversion lens group such as the wide-angle attachment lens. The selected zoom area is indicated to the operator. Therefore, the operator is free from possible erroneous recognition in connection with zoom operation in current photographing status.

Since the first area and the second area share a common area, the magnification is changed in a continuous manner. A desired field of view is thus obtained.

Seventh Embodiment

A seventh embodiment of the present invention is now discussed.

The circuit arrangement in this embodiment remains unchanged from that in FIG. 5. The difference from the previous embodiments lies in the process algorithm of the AF microcomputer 115.

This embodiment allows AF to restart in response to the mounting of the wide-angle attachment lens so that unfocused state due to the mounting of the wide-angle attachment lens is quickly prevented.

The background of this embodiment is now discussed.

To perform zooming operation with an object kept in focus with the wide-angle attachment lens 121 mounted, a zooming control different from the one with no wide-angle attachment lens 121 mounted must be employed. As shown in FIG. 2(b), on the telephoto side with respect to the focal length 302, the loci according to object distance diverge out of the focusable focal length area, and no focusing is possible. When the wide-angle attachment lens 121 is mounted, it has been a common practice to fix the variator lens 102 at the wide-angle end to disable zoom operation.

Typically used as an automatic focusing (AF) control method is a so-called hill-climbing method, in which high frequency components of the video signal derived from an image pickup device such as a CCD are extracted, and the focus-compensation lens 105 is driven for focusing so that the high-frequency components as an AF evaluation value are maximized.

As understood from the above discussion, even if an object at a distance is in focus, the position of the focus-compensation lens 105 to continuously keep the object of the same distance in focus changes when the wide-angle attachment lens 121 is mounted or dismounted, resulting in an unfocused state.

In a conventional method, an AF evaluation signal under the unfocused state is picked up, and a determination is made of whether focusing control is to be restarted or not depending on the AF evaluation signal, namely whether the focus-compensation lens 105 is to be shifted or not, before focusing operation is initiated. Therefore, it takes time before a focused state is reached.

If the determination to recover focused state in automatic focusing is attempted in case the mounting of the wide-angle attachment lens gives rise to totally unfocused state, no sufficiently large change in the AF evaluation signal is obtained. The camera may be suspended in unfocused state, or an erroneous determination in connection with the focus driving direction may be made. Unfocused state may be even further worsened, requiring more time before attaining focused state.

The present embodiment has been developed with a view to resolving the above problem. The object of the embodiment is to quickly rectify unfocused state which is caused by the mounting or dismounting of the wide-angle attachment lens (for modifying focal length and magnification).

To achieve the above object, an image pickup apparatus as the seventh embodiment of the present invention comprises, at least, a first lens group (a focus-compensation lens 105), and a second lens group (a wide-angle attachment lens 121) arranged in the optical axis of the first lens group in a manner that permits easy mounting and dismounting of the second lens group, for modifying focal length and magnification by the switching between the mounted state and the dismounted state of the second lens group, and further comprises a lens system so arranged that the position of the first lens group that keeps a particular object distance in focus is changed according to the switching between the mounted and dismounted state of the second lens group, and focus control means (an AF evaluation value processing circuit 114, an AF microcomputer 115, a driver 120, a motor 121) for extracting a sharpness signal responsive to the degree of focus from the video signal that is obtained by photoelectrically converting an optical image formed through the lens system, and for performing focus control by shifting the first lens group in response to the sharpness signal, whereby the image pickup apparatus further comprises restart means (the AF microcomputer 115) for causing the focus control means to restart its focus control by shifting the first lens group when the switching between the mounted state and the dismounted state of the second lens group is performed.

The restart means comprises detection means for detecting the switching between the mounted state and dismounted state of the second lens group, whereby the focus control by the focus control means is restarted by shifting the first lens group when the detection means detects the switching between the mounted and dismounted states of the second lens group.

The restart means is so arranged that the focus control by the focus control means is restarted by shifting the first lens group in a predetermined direction responsive to the mounted or dismounted state of the second lens group when the second lens group is mounted or dismounted.

The restart means is so arranged that the focus control by the focus control means is restarted by shifting the first lens group in the direction to the minimum end when the second lens group is changed from the mounted state to the dismounted state, or in the direction to the infinity end when the second lens group is changed from the dismounted state to the mounted state.

In the above arrangements, the focus control by the focus control means is restarted by shifting the first lens group when the second lens group is switched in its state. Unfocused state due to the switching between the mounted state and dismounted state of the second lens group is thus quickly rectified.

Figure 21:
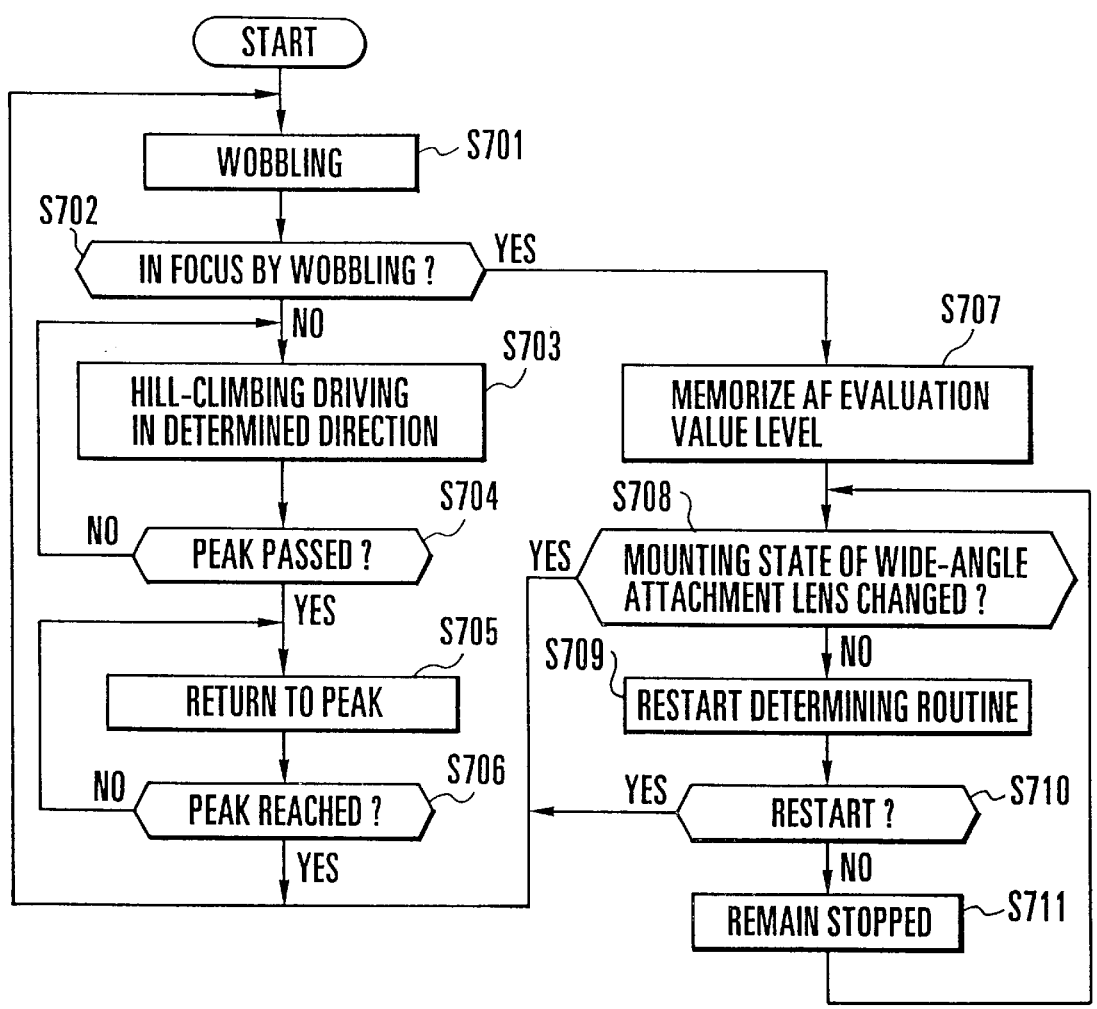
FIG. 21 is a flow diagram showing the AF control operation in a seventh embodiment of the present invention.

Referring to the flow diagram in FIG. 21, the focusing algorithm executed in the AF microcomputer 115 in the seventh embodiment is now discussed.

The AF microcomputer 115 receives the AF evaluation value signal from the AF evaluation value processing circuit 114 while allowing the focus-compensation lens 105 to oscillate in a small magnitude back and forth in wobbling action, and makes a determination of whether the focus-compensation lens 105 is in focused state or unfocused state (if in unfocused state, front-unfocused or back-unfocused) (step S702). When the determination reveals unfocused state, hill climbing is performed in the direction which is determined by the wobbling action (step S703). In succession, a determination is made of whether the in-focus point, namely the peak of the AF evaluation value signal is exceeded or not (step S704). When the peak of the AF evaluation value signal is yet to be reached, the process returns to step S703 to continue the hill climbing.

When the AF evaluation value signal peak is exceeded, the process allows the focus-compensation lens 105 to return to the peak (step S705). A determination is made of whether the AF evaluation value signal peak is reached or not (step S706). When the peak is yet to be reached, the process returns to step S705 to return to the peak. When the peak is reached, the process returns to step S701 to perform wobbling action to restart focus control. This step is required to verify that the reached peak is the real one, namely, the real in-focus point just in case the object changes in the course of panning while the process is in progress to return to the peak of the AF evaluation value signal.

When step S702 reveals focused state as a result of wobbling action, the focus-compensation lens 105 is stopped and the process goes to a restart monitoring routine starting with step S707. At step S707, an AF evaluation value level is stored. A determination is made of whether any switching is made between the mounted state and dismounted state of the wide-angle attachment lens 121 based on the sensed signal from the wide-angle attachment lens mounting detecting switch 123 (step S708). By "Any switching" is meant that the wide-angle attachment lens 121 is changed from mounted state to dismounted state or from dismounted state to mounted state.

When the wide-angle attachment lens 121 is switched in its mounting, the focusable focal length position of the focus-compensation lens 105 to keep an object at a predetermined distance in focus changes according to the switching of the state of the wide-angle attachment lens 121. The focus-compensation lens 105 must be restarted to attain an updated in-focus point. Step S708 reveals the switching in the mounting state of the wide-angle attachment lens 121, the process returns to step S701 to perform wobbling action restarting focus control.

When no switching in the state of the wide-angle attachment lens 121 is made, the process goes to the normal restart monitoring routine at step S709. A determination is made of whether the restart is to be initiated or not (step S710), by comparing the current AF evaluation value signal level with the in-focus AF evaluation value signal level stored at step S707 for any change between both levels. For example, when the current AF evaluation value signal level varies from the stored in-focus AF evaluation value signal level by a predetermined percentage, the determination result is "to restart" based on the assumption that any panning action must have introduced some change in the object. When the variation between the two levels is smaller than the predetermined percentage, the determination result is "not to restart" based on the assumption that no change must have been introduced in the object. Noise or a slight change in the object will not initiate the restart.

When step S710 results in the "not-restart" determination, the focus-compensation lens 105 remains stopped there (step S711). The process returns to step S708 to perform the restart monitoring routine again. When step 710 results in the "restart" determination, the process returns to step S701 to start wobbling action again for-focus control. A series of these steps are repeated so that the focus-compensation lens 105 is controlled to keep constantly in-focus state.

As described above, when the wide-angle attachment lens 121 is mounted or dismounted, the focus control is forced to restart according to the restart monitoring based on the AF evaluation value signal. The time required to make a determination of whether the restart of focus control is to be initiated or not in AF processing is saved and an improved response results. Namely, when a determination is made of the restart of focus control, based on the AF evaluation value signal, some time is required before the restart is performed. This is because the determination must be made after high-frequency components are extracted under the selected state when the wide-angle attachment lens 121 is switched in its state, from mounted to dismounted or from dismounted to mounted. In this embodiment, however, the restart is forced when the wide-angle attachment lens 121 is switched in its state. Thus, at the moment the wide-angle attachment lens 121 is mounted or dismounted, the restart is executed. The restart is thus complete while the AF evaluation value signal is being produced from the video signal in succession to the mounting or dismounting of the wide-attachment lens 121. The unfocused state due to the mounting or dismounting of the wide-angle attachment lens 121 is thus quickly rectified.

Eighth Embodiment

Figure 22:
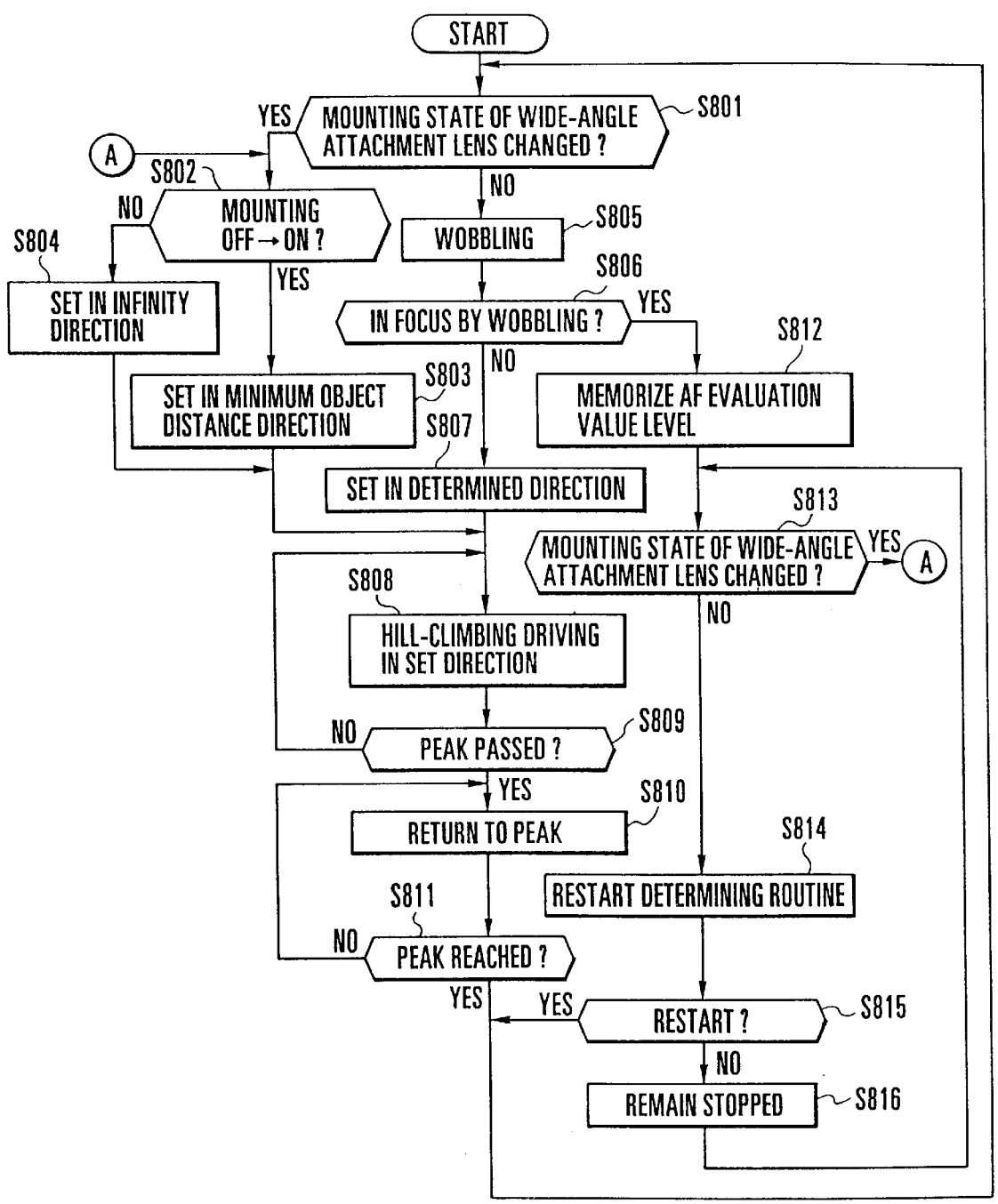
FIG. 22 is a flow diagram showing the AF control operation in an eighth embodiment of the present invention.

Referring to the flow diagram in FIG. 22, the focusing algorithm in an eighth embodiment is now discussed. In the seventh embodiment, the unfocused state due to the mounting or dismounting of the wide-angle attachment lens 121 is quickly rectified by forcing the restart of focus control. In the eighth embodiment, the unfocused state due to the mounting or dismounting of the wide-angle attachment lens 121 is quickly and assuredly rectified by forcing the hill climbing in the direction of focusing according to the mounting or dismounting of the wide-angle attachment lens 121.

The AF microcomputer 115 makes a determination of whether the wide-attachment lens 121 is mounted or dismounted according to the sensed signal from the wide-angle attachment lens mounting detecting switch 123 (step S801). When any switching takes place, a determination is made of whether the switching is from dismounted state (OFF) to mounted state (ON) or not (step S802).

When the switching is performed from dismounted state (OFF) to mounted state (ON), the direction of movement of the focus-compensation lens 105 is set to the minimum end (step S803), and the process proceeds to step S808. When the switching is performed from mounted state (ON) to dismounted state (ON), the direction of movement of the focus-compensation lens 105 is set to the infinity end (step S804), and the process proceeds to step S808. The direction of movement of the focus-compensation lens 105 in response to the switching between the mounted and dismounted state of the wide-angle attachment lens 121 is set taking into consideration the fact that the mounting of the wide-angle attachment lens 121 shifts the position of the focus-compensation lens 105 toward the minimum end to keep the same object distance in focus as shown in FIG. 2(b).

When step S801 reveals that no switching between the mounted state and dismounted state of the wide-angle attachment lens 121 has taken place, the AF microcomputer 115 receives the AF evaluation value signal from the AF evaluation value processing circuit 114 while allowing the focus-compensation lens 105 to oscillate in a small magnitude back and forth in wobbling action, and makes a determination of whether the focus-compensation lens 105 is in focused state or unfocused state (if in unfocused state, front-unfocused or back-unfocused) (step S806). When the determination reveals unfocused state, the direction of movement of the focus-compensation lens 105 (the direction of hill climbing) is set in the direction determined by the wobbling action (step S807), and then the process goes to step S808.

At step S808, hill climbing is performed according to any of the directions determined at steps S803, S804 and S807. A determination is made of whether the infocus point or the peak of the AF evaluation value signal is exceeded or not (step S809). If it is exceeded, the process returns to step S808 to continue hill climbing.

When the AF evaluation value signal peak is exceeded, the process allows the focus-compensation lens 105 to return to the peak (step S810). A determination is made of whether the AF evaluation value signal peak is reached or not (step S811). When the peak is yet to be reached, the process returns to step S810 to return to the peak. When the peak is reached, the process returns to step S801 to perform wobbling action to restart focus control. This step is required to verify that the reached peak is the real one, namely, the real in-focus point just in case the object changes in the course of panning while the process is in progress to return to the peak of the AF evaluation value signal.

When step S806 reveals focused state as a result of wobbling action, the focus-compensation lens 105 is stopped and the process goes to a restart monitoring routine starting with step S812. At step S812, an infocus AF evaluation value level is stored. A determination is made of whether any switching is made between the mounted state and dismounted state of the wide-angle attachment lens 121 based on the sensed signal from the wide-angle attachment lens mounting detecting switch 123 (step S813). When the wide-angle attachment lens 121 is switched in its mounting, the process goes to step S802 to allow the focus-compensation lens 105 to hill-climb in the direction in response to the switching between the mounted and dismounted states of the wide-angle attachment lens 121. On the other hand, when no switching in the state of the wide-angle attachment lens 121 is made, the process goes to the normal restart monitoring routine at step S814. A determination is made of whether the restart is to be initiated or not (step S815), by comparing the current AF evaluation value signal level with the in-focus AF evaluation value signal level stored at step S814 for any change between both levels. For example, when the current AF evaluation value signal level varies from the stored in-focus AF evaluation value signal level by a predetermined percentage, the determination result is "to restart" based on the assumption that any panning action must have introduced some change in the object. When the variation between the two levels is smaller than the predetermined percentage, the determination result is "not to restart" based on the assumption that no change must have been introduced in the object.

When step S815 results in the "not-restart" determination, the focus-compensation lens 105 remains stopped there (step S816). The process returns to step S813 to perform the restart monitoring routine again. When step S815 results in the "restart" determination, the process returns to step S801 to start wobbling action again for focus control. A series of these steps are repeated so that the focus-compensation lens 105 is controlled to keep constantly in-focus state.

In the eighth embodiment, as described above, the unfocused state due to the switching between the mounted and dismounted states of the wide-angle attachment lens 121 is quickly and assuredly rectified by forcing the hill climbing in the focusing direction. The apparatus in this embodiment of the present invention, therefore, recognizes the correct focusing direction even when the AF evaluation value from wobbling action is overwhelmed by noise, is free from suspension in unfocused state, and does not take a substantially long time before reaching focused state, when a severe unfocused state takes place at the switching between the mounted and dismounted states.

As described above, the image pickup apparatus of the present invention comprises, at least, a first lens group and a second lens group arranged in the optical axis of the first lens group in a manner that permits mounting and dismounting of the second lens group, for modifying focal length and magnification by the switching between the mounted state and the dismounted state of the second lens group, and further comprises a lens system so arranged that the position of the first lens group that keeps a particular object distance in focus is changed according to the switching between the mounted and dismounted state of the second lens group, and focus control means for extracting a sharpness signal responsive to the degree of focus from the video signal that is obtained by photoelectrically converting an optical image formed through the lens system, and for performing focus control by shifting the first lens group in response to the sharpness signal, whereby the image pickup apparatus further comprises restart means for causing the focus control means to restart its focus control by shifting the first lens group when the switching between the mounted state and the dismounted state of the second lens group is performed. The image pickup apparatus thus rectifies quickly unfocused state which is caused by the positional change of the first lens group with respect to the same object distance when the second lens group is mounted or dismounted.

What is claimed is:

1. An image pickup apparatus comprising
   (A) a focusing lens for adjusting the degree of focus,
   (B) a conversion lens, detachably mounted in an optical axis of the focusing lens, for changing a focused position of the focusing lens corresponding to a predetermined object distance in response to a mounting or dismounting operation of said conversion lens,
   (C) automatic focus control means for driving the focusing lens to an in-focus point by detecting a predetermined focusing signal that varies in response to the degree of focus, and
   (D) control means, in the state that the focusing lens is positioned at the in-focus point, for restarting the automatic focus control means from the in-focus point as an initial position of a restarting operation in response to the mounting or dismounting operation of the conversion lens.

2. The image pickup apparatus according to claim 1, further comprising image pickup means for photoelectrically converting an optical image input through each of said lenses into an image signal and for outputting the image signal, wherein said automatic focus control means detects the degree of focus based on a high-frequency component of the image signal.

3. The image pickup apparatus according to claim 1, wherein said control means determines a driving direction of the focusing lens depending on whether the conversion lens is mounted or not.

4. The image pickup apparatus according to claim 3, wherein said control means restarts the automatic focus control means by driving the focusing lens toward an infinity end when the conversion lens is mounted or toward a minimum end when the conversion lens is not mounted.

5. The image pickup apparatus according to claim 4, wherein said conversion lens is a detachably mounted wide-angle attachment lens which shifts the focal length toward a wide-angle side.

6. An image pickup apparatus comprising (A) a variator lens for zooming, (B) a focusing lens for adjusting the degree of focus, (C) a conversion lens, detachably mounted in an optical axis of the variator lens and the focusing lens for changing a shifting area of the variator lens focusable with the focusing lens, (D) automatic focus control means for driving the focusing lens to an in-focus position by detecting a predetermined focusing signal that varies in response to the degree of focus, and (E) control means, in the state that the focusing lens is positioned at the in-focus point, for restarting the automatic focus control means from the in-focus point as an initial position of a restarting operation in response to the mounting or dismounting operation of the conversion lens.

7. The image pickup apparatus according to claim 6, further comprising image pickup means for photoelectrically converting an optical image input through each of said lenses into an image signal and for outputting the image signal, wherein said automatic focus control means detects the degree of focus based on a high-frequency component of the image signal.

8. The image pickup apparatus according to claim 6, wherein said control means changes the shifting area of the variator lens depending on whether the conversion lens is mounted or not and determines a driving direction of the variator lens at a restart.

9. The image pickup apparatus according to claim 8, wherein said control means restarts the automatic focus control means by driving the focusing lens toward an infinity end when the conversion lens is mounted or toward a minimum end when the conversion lens is not mounted.

10. The image pickup apparatus according to claim 9, wherein said conversion lens is a detachably mounted wide-angle attachment lens which shifts the focal length toward a wide-angle side.

11. An image pickup apparatus comprising (A) a focusing lens for adjusting the degree of focus, (B) a conversion lens detachably mounted in said image pickup apparatus in a location remote from an optical axis of the focusing lens and movable from the remote location to a further location to have an optical axis of the conversion lens coincident with the optical axis of the focusing lens for changing a focused position of the focusing lens corresponding to a predetermined object distance in response to a movement of the conversion lens, (C) automatic focus control means for driving the focusing lens to an in-focus point by detecting a predetermined focusing signal that varies in response to the degree of focus, and (D) control means for restarting the automatic focus control means from the in-focus point as an initial position of a restarting operation in response to the movement of the conversion lens to said further location.

12. An image pickup apparatus comprising (A) a variator lens for zooming, (B) a focusing lens for adjusting the degree of focus, (C) a conversion lens detachably mounted in said image pickup apparatus in a location remote from an optical axis of the focusing lens and movable from the remote location to a further location to have an optical axis of the conversion lens coincident with the optical axis of the focusing lens, for changing a shifting area of the variator lens focusable with the focusing lens, (D) automatic focus control means for driving the focusing lens to an in-focus position by detecting a predetermined focusing signal that varies in response to the degree of focus, and (E) control means for restarting the automatic focus control means from the in-focus point as an initial position of a restarting operation in response to the movement of the conversion lens to said further location.

\* \* \* \* \*

UNITED STATES PATENT AND TRADEMARK OFFICE
CERTIFICATE OF CORRECTION

PATENT NO. : 6,356,307 B2
DATED : March 12, 2002
INVENTOR(S) : Hiroto Ohkawara et al.

It is certified that error appears in the above-identified patent and that said Letters Patent is hereby corrected as shown below:

Column 2,
Line 59, delete "$p(n+1)=\{|p(n)-(n)|/|b(n)-a(n)|\}$" and insert -- $p(n+1)=\{|p(n)-a(n)|/|b(n)-a(n)|\}$ --.

Column 12,
Line 66, before "gained" insert -- is --.

Column 18,
Line 66, delete "(V-C)" and insert -- (V-C). --.

Column 22,
Line 38, delete "generator-126" and insert -- generator 126 --.

Column 24,
Line 67, delete "area" and insert -- areas --.

Column 25,
Line 4, delete "firs t" and insert -- first --.

Column 28,
Line 4, delete "for-focus" and insert -- for focus --.

Signed and Sealed this

Fourteenth Day of January, 2003

JAMES E. ROGAN
*Director of the United States Patent and Trademark Office*